(12) United States Patent
Shishido et al.

(10) Patent No.: US 7,503,233 B2
(45) Date of Patent: Mar. 17, 2009

(54) VEHICLE CONTROL APPARATUS AND CONTROL METHOD

(75) Inventors: Kentaro Shishido, Chiyoda-ku (JP);
Hiroshi Kuroiwa, Hitachinaka (JP);
Yoshiyuki Yoshida, Chiyoda-ku (JP);
Tetsuo Matsumura, Chiyoda-ku (JP);
Kinya Fujimoto, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 396 days.

(21) Appl. No.: 11/498,767

(22) Filed: Aug. 4, 2006

(65) Prior Publication Data
US 2007/0037660 A1   Feb. 15, 2007

(30) Foreign Application Priority Data
Aug. 9, 2005   (JP)   ............................. 2005-230240

(51) Int. Cl.
  *F16H 3/38*   (2006.01)
(52) U.S. Cl. ...................................................... 74/339
(58) Field of Classification Search ...................... None
  See application file for complete search history.

(56) References Cited

U.S. PATENT DOCUMENTS 6,550,352 B2    4/2003  Okada et al.
6,770,010 B2 *  8/2004  Matsumura et al. ......... 477/124
6,889,570 B2 *  5/2005  Kayano et al. ................ 74/339
6,896,641 B2 *  5/2005  Matsumura et al. ......... 477/115
7,211,028 B2 *  5/2007  Matsumura et al. ......... 477/124
7,252,622 B2 *  8/2007  Shishido et al. ............. 477/116
2006/0247091 A1* 11/2006  Matsumura et al. ........... 477/84

FOREIGN PATENT DOCUMENTS

| JP | 61-45163 A   | 3/1986  |
| JP | 2002-168338 A | 6/2002 |
| JP | 2002-174335 A | 6/2002 |
| JP | 2003-269599 A | 9/2003 |
| JP | 2003-314678 A | 11/2003 |

* cited by examiner

*Primary Examiner*—Dirk Wright
(74) *Attorney, Agent, or Firm*—Crowell & Moring LLP

(57) ABSTRACT

In a torque assisted automated MT, an assist clutch is controlled to ensure that the transmission torque increase rate is reduced when disengaging a dog clutch while engaging the assist clutch. In a twin clutch type automated MT, in stepped speed change, one of the two clutches as the twin clutch is controlled in such a way that the transmission torque increase rate resulting from engagement is reduced with the passage of time, when disengaging the dog clutch prior to speed change while engaging the clutch corresponding to the input shaft in charge of offsetting the torque interruption.

20 Claims, 21 Drawing Sheets

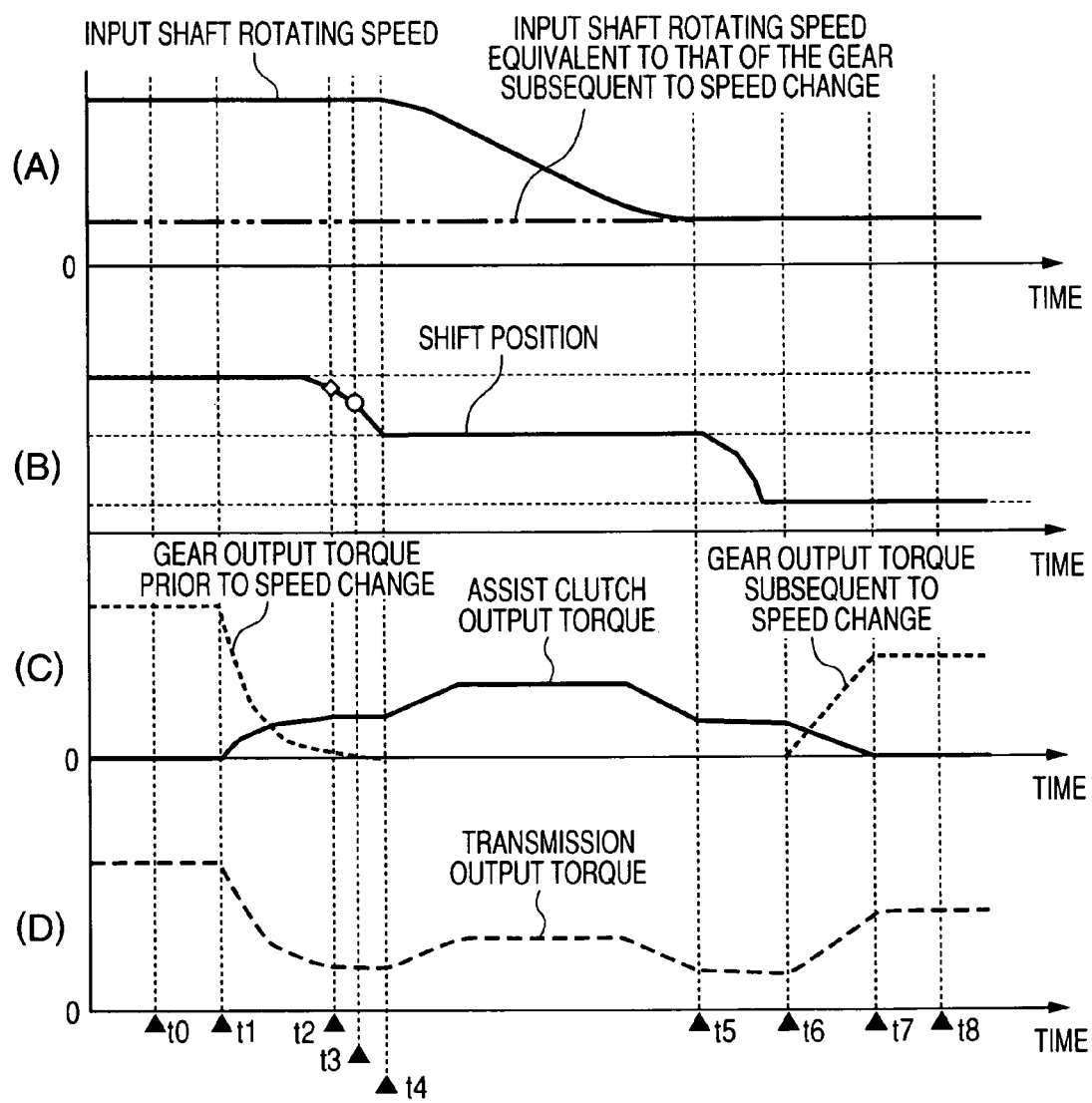

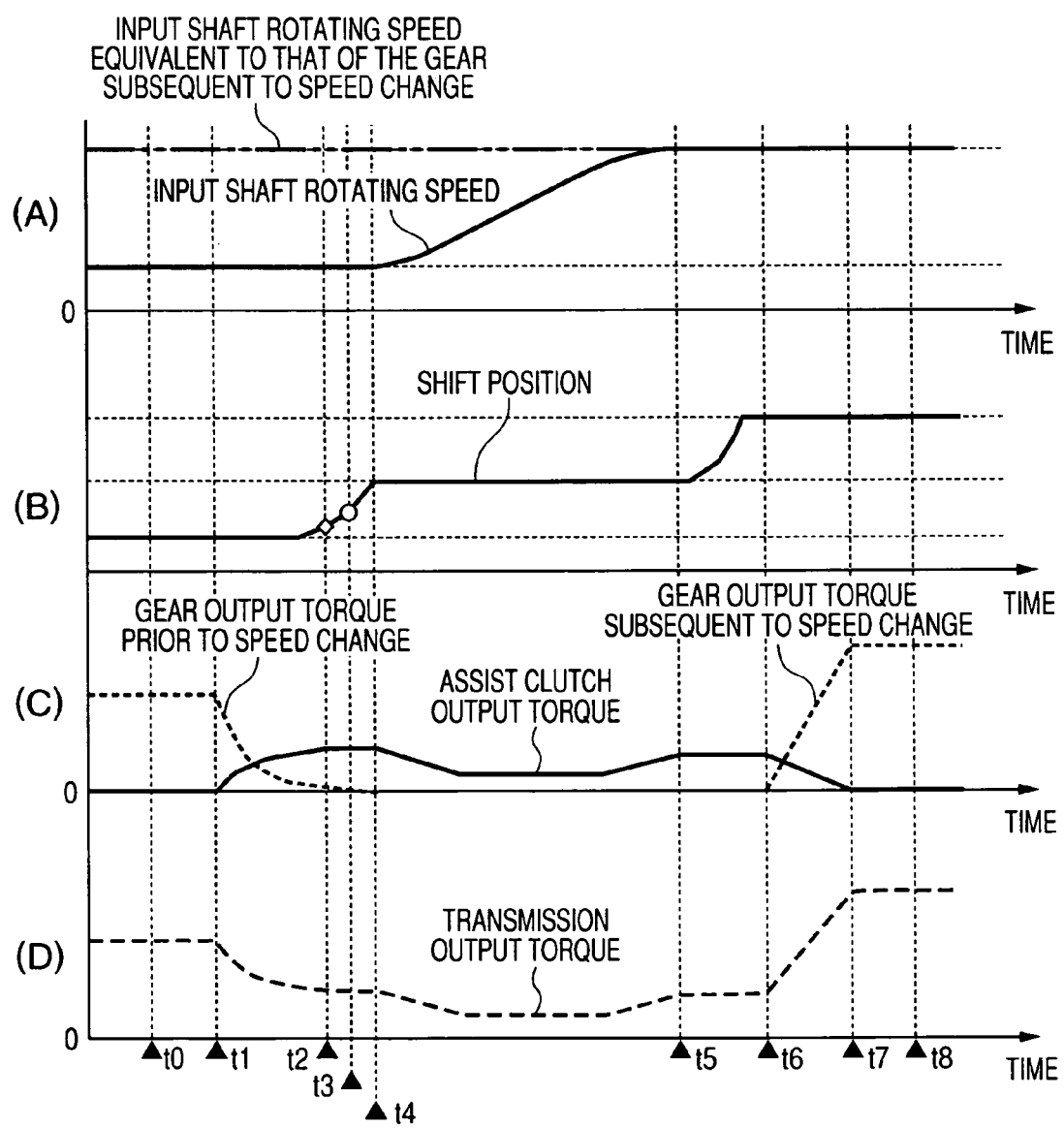

VEHICLE CONTROL APPARATUS AND CONTROL METHOD

CLAIM OF PRIORITY

The present application claims priority from Japanese application serial no. 2005-230240, filed on Aug. 9, 2005, the content of which is hereby incorporated by reference into this application.

FIELD OF THE INVENTION

The present invention relates to a vehicle control apparatus and control method, particularly to a speed change control of an automatic transmission.

BACKGROUND OF THE INVENTION

Amid the elevated awareness of crisis in the face of global warming problems in recent years, vehicle transmission is required to provide higher efficiency, and efforts have been made for the development of technologies for expansion of the lockup area in an automatic transmission (AT) using a torque converter or compatibility of a continuously variable transmission with a vehicle of greater displacement. Against this backdrop, an automated MT (automatic manual transmission) has been developed to automate the clutch operation and gear change using the mechanism of a manual transmission of high transmission efficiency.

However, in the control method at the time of speed change based on the conventional MT, the drive torque is interrupted by the disengagement and engagement of the clutch, and this gives a sense of incompatibility to the driver.

In an effort to solve this problem, a new proposal has been produced of a torque assisted automated MT made of the automated MT equipped with a friction clutch (assist clutch) (See Japanese Patent Laid-Open No. Sho 61 (1986)-045163). In this torque assisted automated MT, the dog clutch prior to speed change is switched over to the assist clutch, and the assist clutch is then switched over to the dog clutch, whereby torque interruption is avoided.

In another proposal, two power transmission systems leading from the output shaft of the prime mover to the transmission output shaft are provided. This is a twin clutch type automated MT that has two clutches for switching between connection and disconnection of the input torque from each of the power transmission systems. In this twin clutch type automated MT, torque interruption is avoided by speed change from the gear of one of the power transmission systems to that of the other power transmission systems through the operation of switching between two clutches.

SUMMARY OF THE INVENTION

In the aforementioned torque assisted automated MT and twin clutch automated MT, a torque difference may be produced by instrumental errors or chronological changes at the time of switching between clutches.

The object of the present invention is to reduce the torque difference at the time of switching between clutches of the automated MT.

In a torque assisted automated MT, the assist clutch is controlled in such a way that the increase rate of the transmission torque accompanying engagement is reduced with the passage of time, when the dog clutch is disengaged during engagement of the assisted clutch.

In the twin clutch automated MT, in the case of stepped speed change, one of the clutches of the twin clutch system is controlled in such a way that the increase rate of the transmission torque accompanying engagement is reduced with the passage of time when the dog clutch prior to initial speed change is disengaged during engagement of the other of the aforementioned two clutches arranged on the input shaft for offsetting the torque interruption.

When the increase rate is reduced with the passage of time, evaluation is made to see whether or not the transmission torque of the aforementioned one of the clutches in the assist clutch or twin clutch corresponds to the input torque, in response to a change in at least any one of the parameters for the dog clutch engagement member position, dog clutch engagement member traveling speed, dog clutch engagement member traveling speed change, input shaft rotating speed change, vehicle acceleration rate, output shaft torque and output shaft rotating speed change, for example. Based on the result of this evaluation, the control signal for the aforementioned one of the clutches in the assist clutch or twin clutch is preferably changed in the direction of reducing the increase rate of the torque transmission amount.

The present invention reduces the torque difference in switching between the clutches of the automated MT.

BRIEF DESCRIPTION OF THE DRAWINGS

FIG. 10 is an time chart representing the up shift as an example of FIG. 4;

FIG. 11 is a time short at the time of down shift in the example of FIG. 4;

DESCRIPTION OF THE PREFERRED EMBODIMENTS

Figure 3A:
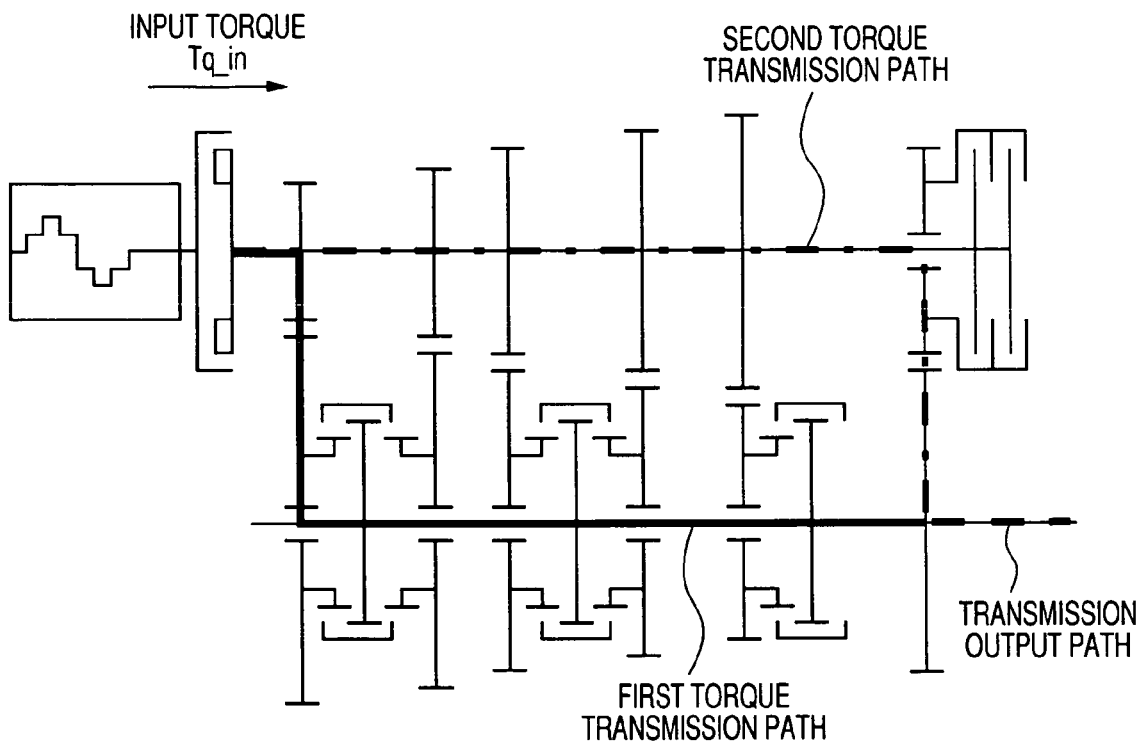
FIG. 3 is a state of torque transmission at the time of gear disengagement in the torque assisted automated MT.

The following describes the embodiments of the present invention:

FIG. 3A is a skeleton diagram representing an example of automatic transmission arrangement at the time of gear disengagement in the torque assisted automated MT.

Figure 3B:
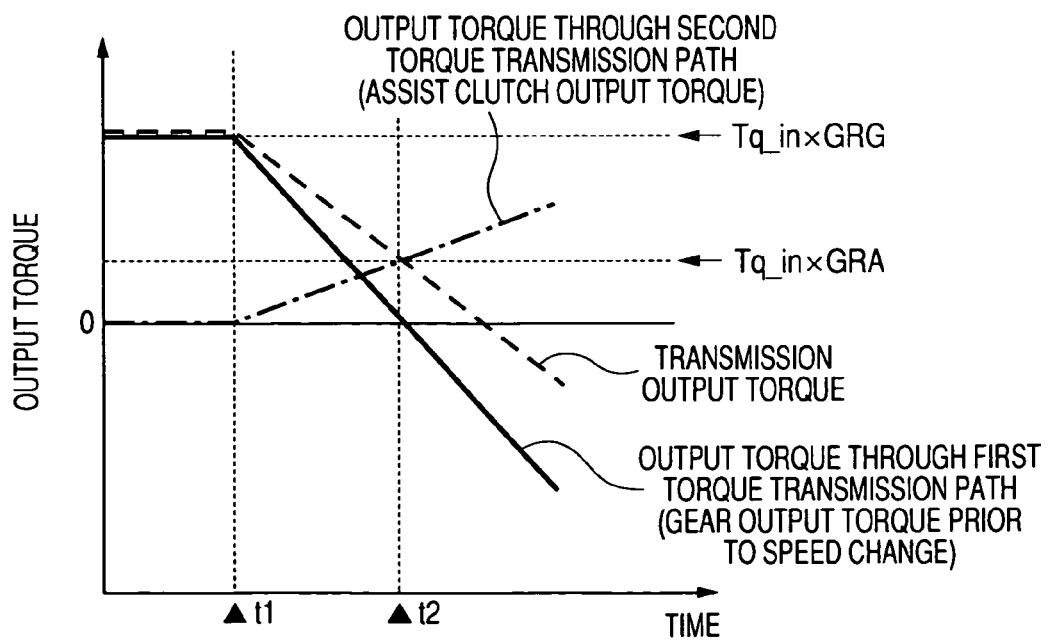

FIG. 3B is a time chart representing the transmission output torque at the time of gear disengagement in the torque assisted automated MT.

In the assisted automated MT, when speed change has started and a step has been taken to disengage the gear train in the process of torque transmission using a dog clutch transmission device, part of the input torque for the transmission is transmitted by the assist clutch, and part of the transmission torque of the gear train is released. Then the dog clutch transmission device is shifted to the released position, whereby the gear train is disengaged.

Assume that the path for torque transmission by the gear train is a first torque transmission path, and the path for torque transmission by the assist train is a second torque transmission path. FIG. 3A is a skeleton diagram representing an example of automatic transmission arrangement. An example of the first torque transmission path is indicated by a solid line, and an example of the second torque transmission path is indicated by a one-dot chain line, while output torque path of the transmission is shown by a broken line. FIG. 3B is a time chart representing the transmission output torque. The output torque by the first torque transmission path is indicated by a solid line, the output torque by the second torque transmission path is indicated by a one-dot chain line, while output torque path of the transmission is shown by a broken line.

Up to the time point t1 in FIG. 3B, i.e. before the start of speed change, the transmission torque of the first torque transmission path (hereinafter referred to as "gear transmission torque prior to speed change") is exactly the same as the Tq_in. This input torque is transmitted to the output shaft only through the torque transmission path. Accordingly, if the torque amplification ratio of the first torque transmission is assumed as GRG, the output torque of the transmission is Tq_in×GRG. In the meantime, the transmission torque passing through the second torque transmission path (hereinafter referred to as "assist clutch transmission torque") is 0 (zero). The output torque of the second torque transmission path (hereinafter referred to as "assist clutch output torque") is also 0 (zero).

The output torque of the transmission corresponds to the total of the gear output torque prior to speed change and assist clutch transmission torque. When the assist clutch transmission torque is 0, the output torque when the assist clutch transmission torque is 0 will be Tq_in×GRG, the same as the gear output torque prior to speed change.

If the assist clutch transmission torque (assist clutch output torque) is increased after time point t1, the torque of first torque transmission path shifts to the second torque transmission path. At time point t2, the gear output torque prior to speed change becomes 0. When the input torque is Tq_in, the assist clutch transmission torque is Tq_in, the same as the input torque. When the torque amplitude ratio of the second torque transmission path is GRA, the assist clutch transmission torque at this time is Tq_in×GRA. The output torque of the automatic transmission at this time is Tq_in×GRA, the same as the assist clutch output torque.

If the assist clutch transmission torque (assist clutch output torque) is increased after time point t2, the gear output torque prior to speed change will have a negative value. The output torque of the transmission corresponds to the total of the gear output torque prior to speed change and assist clutch output torque. Accordingly, if the gear output torque prior to speed change has either a positive or negative value when the dog clutch of the first torque transmission path is disengaged, the torque equivalent to the gear output torque prior to speed change will disappear from the output torque of the transmission, whereby a torque difference occurs.

If the dog clutch of the first torque transmission path is disengaged when the assist clutch output torque is Tq_in× GRA, and the gear output torque prior to speed change is approximately 0, no torque difference occurs to the gear output torque prior to speed change, and no shock is produced. To ensure this, the dog clutch of the first torque transmission path should be disengaged when the gear output torque prior to speed change has come closer to 0, i.e. when the assist clutch transmission torque has reached the input torque.

However, the dog clutch may be disengaged at other than the optimum time, because of the variation in the rise of the assist clutch transmission torque due to an instrumental error and chronological deterioration, or variation in the engine torque. This may cause torque difference to occur, with the result that the feeling of speed change may be put out of order.

To prevent this, the following arrangement can be devised: The assist clutch transmission torque is estimated or detected. Based on the estimated or detected assist clutch transmission torque, a step is taken to detect the optimum time when the transmission torque of the gear train is sufficiently disengaged. According to the optimum time having been detected, a load is applied so that the dog clutch transmission device is shifted to the disengagement position, whereby the gear is disengaged.

However, it will incur a cost increase to provide a new sensor for detection of the assist torque, and to detect the optimum time when the transmission torque of the gear train is sufficiently disengaged.

When the assist clutch transmission torque is estimated to calculate the optimum time when the transmission torque of the gear train is sufficiently disengaged, the estimation of the assist clutch transmission torque is accompanied by an error due to the variation in instrumental errors and chronological deterioration. This will result in discrepancy between the theoretical optimum time and actual optimum time. Thus, the dog clutch is not always disengaged at the proper time, and torque difference may occur, with the result that the feeling of speed change may be put out of order.

To solve this problem, the following control arrangement can be considered: Before dog clutch is disengaged, a load is applied in such a way that the dog clutch is shifted to the disengagement position. When at least a part of the transmission torque of the gear train has been disengaged, the dog clutch is moved to the disengagement position. The dog clutch is disengaged approximately at the time when the transmission torque of the gear train is sufficiently disengaged. (This control arrangement will be referred to as "pre-disengagement control").

Figure 20:
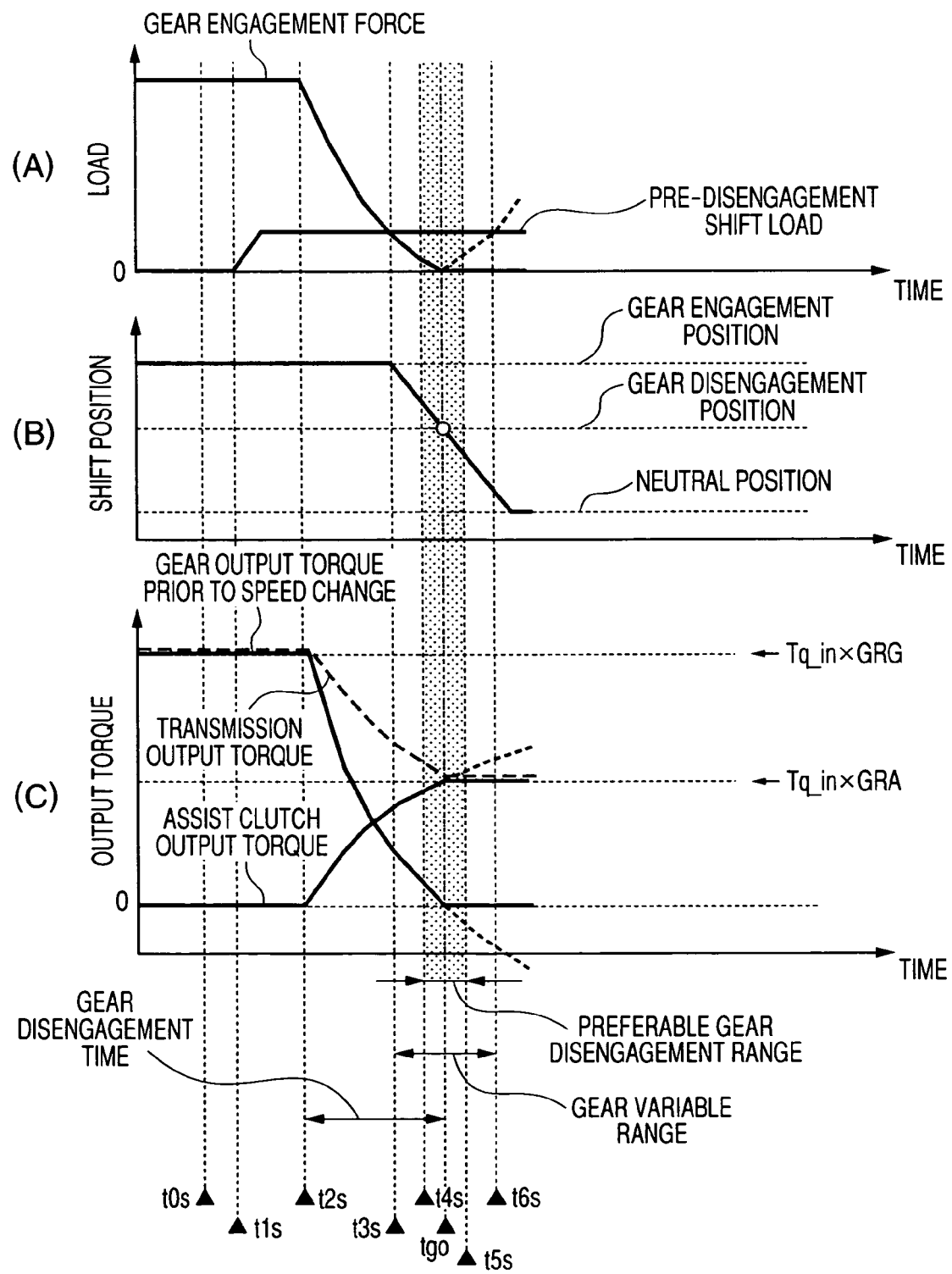
FIG. 20 is a time chart for the execution of pre-disengagement control.

FIG. 20 is a reference drawing showing the time chart for the execution of pre-disengagement control.

FIG. 20(A) is a time chart representing the load applied to the dog clutch. FIG. 20(B) is a time chart representing the position of the dog clutch (hereinafter referred to as "shift position"). FIG. 20(C) is a time representing the output torque of the transmission.

A load in the direction of disengagement (hereinafter referred to as "pre-disengagement shift load") is applied to the dog clutch engagement mechanism at time point t1s. In this case, if the torque is not transmitted through the dog clutch, the pre-disengagement shift load is to a value greater than the load for disengagement of the dog clutch.

At time point t2s, the assist clutch transmission torque (assist clutch output torque) starts to rise. The gear output torque prior to speed change reduces with the rise of the assist clutch output torque.

In the meantime, the load for maintaining engagement (hereinafter referred to as "gear engagement force") is applied to the dog clutch. The gear engagement force is proportional to the gear output torque prior to speed change.

Assume that the input torque is Tq_in, and the torque amplitude ratio of the second torque transmission path is GRA. The gear output torque prior to speed change becomes 0 at time point t5s when the assist clutch output torque is reduced to Tq_in×GRA.

From the time point t3s when the gear engagement force is reduced below the pre-disengagement load, the gear prior to speed change starts to move in the direction of disengagement. At time point tgo, the gear is disengaged.

The broken line having the same value at time point tgo with the assist clutch output torque waveform of FIG. 20(C) and leading from the time point tgo represents a waveform for the case where the assist clutch output torque is increased without allowing the gear to be disengaged at time point tgo.

The broken line having the same value at time point tgo with the waveform of the gear output torque prior to speed change in FIG. 20(C) and leading from the time point tgo represents the gear output torque prior to speed change in the case where the assist clutch output torque is increased without allowing the gear to be disengaged at time point tgo. A negative torque appears after time point tgo In this case, shift is possible in the direction of gear disengagement during the time from time point t3s through t6s when the gear engagement force is reduced below the pre-disengagement load (gear movable range).

Furthermore, if the gear is disengaged during the time from time point t4s through t6s when the gear transmission torque prior to speed change is within the predetermined range, no difference occurs to the output torque, and shock can be reduced (preferable gear disengagement range).

Figure 21:
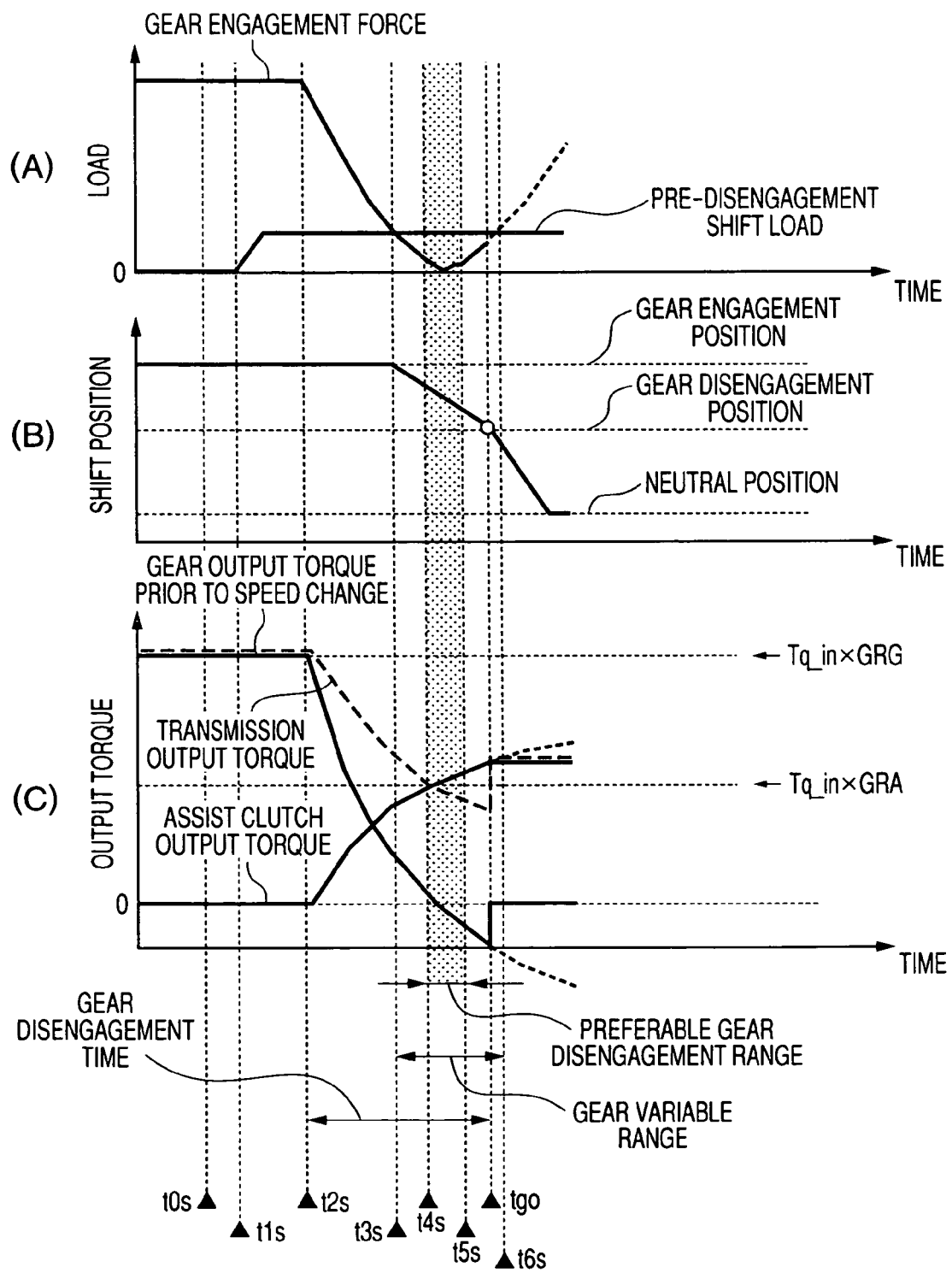
FIG. 21 represents an example of the torque difference occurring at the time of pre-disengagement control.

FIG. 21 is a reference drawing representing an example of the torque difference occurring at the time of pre-disengagement control.

FIG. 21(A) is a time chart representing the load applied to the dog clutch transmission device.

FIG. 21(B) is a time chart showing the shift position. FIG. 21(C) is a time chart showing the output torque of the transmission.

At time point t3s of FIG. 21, the gear engagement force is reduced below the pre-disengagement load, and the engagement transmission device starts to shift to the disengagement position. After that, a certain period of time is required for the completion of gear disengagement. In actual practice, at time period tgo for gear disengagement, the preferable gear disengagement range (time point t4s through time point t5s in FIG. 21) may be exceeded. In this case, immediately before time point tgo, the gear output torque prior to speed change is negative. The negative gear output torque prior to speed change disappears from the output torque due to gear disengagement. Accordingly, torque difference is produced. Furthermore, if the gear movable range has been exceeded, gear disengagement may not be carried out.

To solve this problem, the following arrangement can be considered: The pre-disengagement shift load is set to a smaller value in an initial phase. Upon detection of the start of the movement of the dog clutch transmission device to the disengagement position, the pre-disengagement shift load is increased, whereby the gear disengagement speed is increased, and the gear is disengaged approximately at the time when the transmission torque of the gear train is sufficiently disengaged.

However, if the response speed of the mechanism for causing movement of the dog clutch transmission device is not sufficient, the start of movement of the transmission device to the disengagement position is detected, the pre-disengagement shift load is increased. After that, there is an actual increase of the speed of movement of the dog clutch transmission device to the disengagement position, and the torque difference is produced before the gear is disengaged, with the result that the operation feeling may go out of order.

To reduce such a torque difference, control is provided in such a way that the assist clutch output torque gradually comes closer to the Tq_in×GRA.

Figure 2:
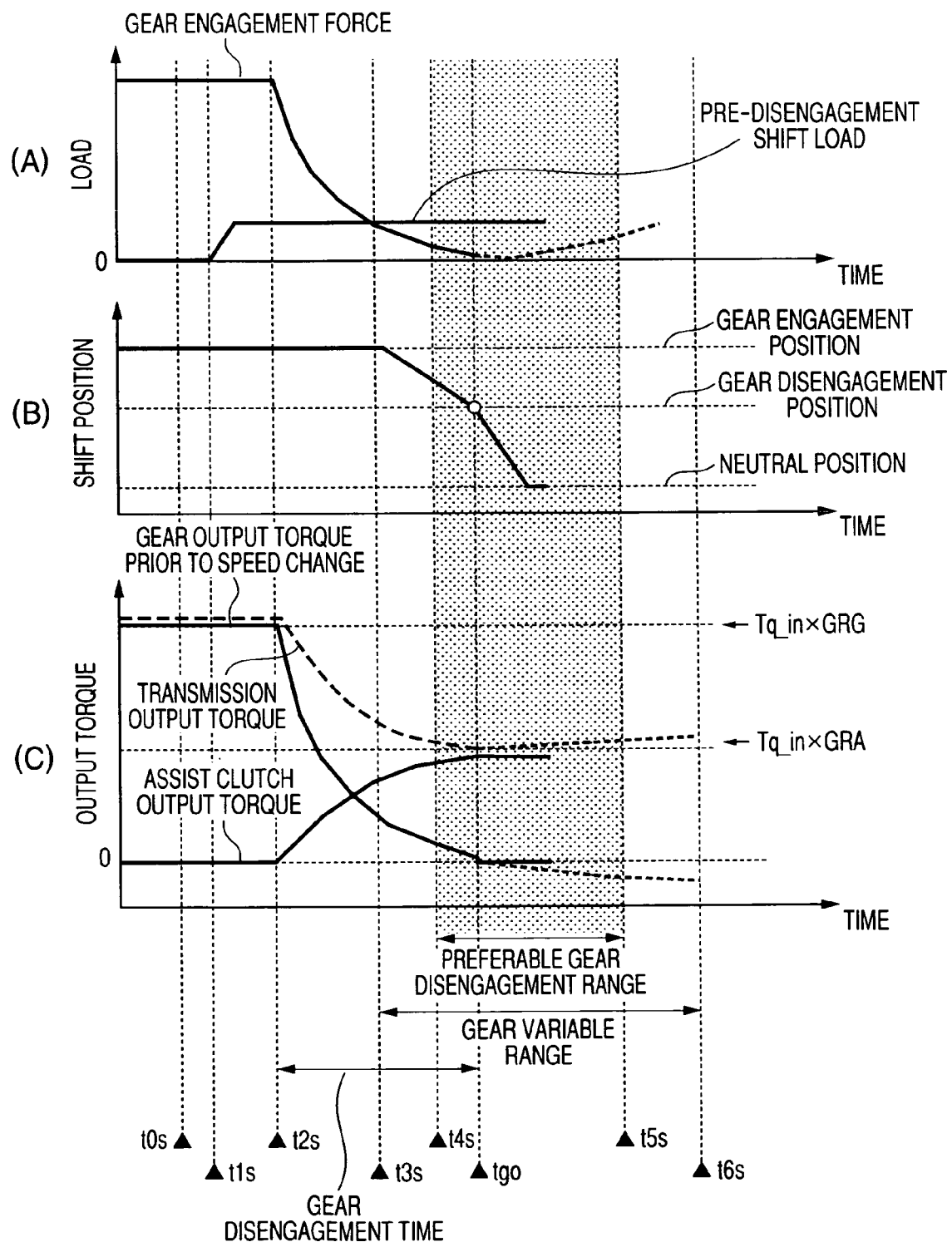
FIG. 2 is a time chart based on the control as an embodiment of the present invention.

FIG. 2 is a time chart based on the control as an embodiment of the present invention. FIG. 2(A) indicates the load applied to the dog clutch transmission device, and FIG. 2(B) shows the position of shift. FIG. 2(C) displays the output torque of the transmission.

If the assist clutch output torque increasing rate is reduced with the passage of time when the assist clutch output torque from the time point t1s is increased, the time duration when the assist clutch transmission torque comes close to the input torque will be prolonged, and the time duration when the gear output torque prior to speed change is close to 0 will be prolonged. This arrangement expands both the gear movable range (time points t3s through t6s) and preferable gear disengagement range (time points t4s through t5s).

Even if time is required before the gear disengagement in actual practice after the dog clutch transmission device has started movement to the disengagement position, and even if the gear disengagement time is different from the assumed time due to the instrumental error or chronological change, the time for gear disengagement tgo is included in the preferable gear disengagement range. Thus, this arrangement has the advantage of reducing the torque difference in actual practice.

In the example of FIG. 2, the torque difference can be reduced. Since the time before reaching the gear movable range (time duration from t1s through t3s) is prolonged, the gear disengagement time is prolonged. The operation feeling goes out of order, and heat generation is increased, with the result that durability may be reduced. Then if the pre-disengagement shift load is set to a greater value in order to reduce the time for gear disengagement and movement, not only the gear movement speed but also the gear movable range will be increased. This may result in gear disengagement before the transmission torque of the gear train is sufficiently disengaged. Again torque difference occurs at the time of gear disengagement and the operation feeling goes out of order.

The assist clutch output torque increase rate is reduced at the time when the assist clutch transmission torque has been decreased close to the input torque.

Figure 1:
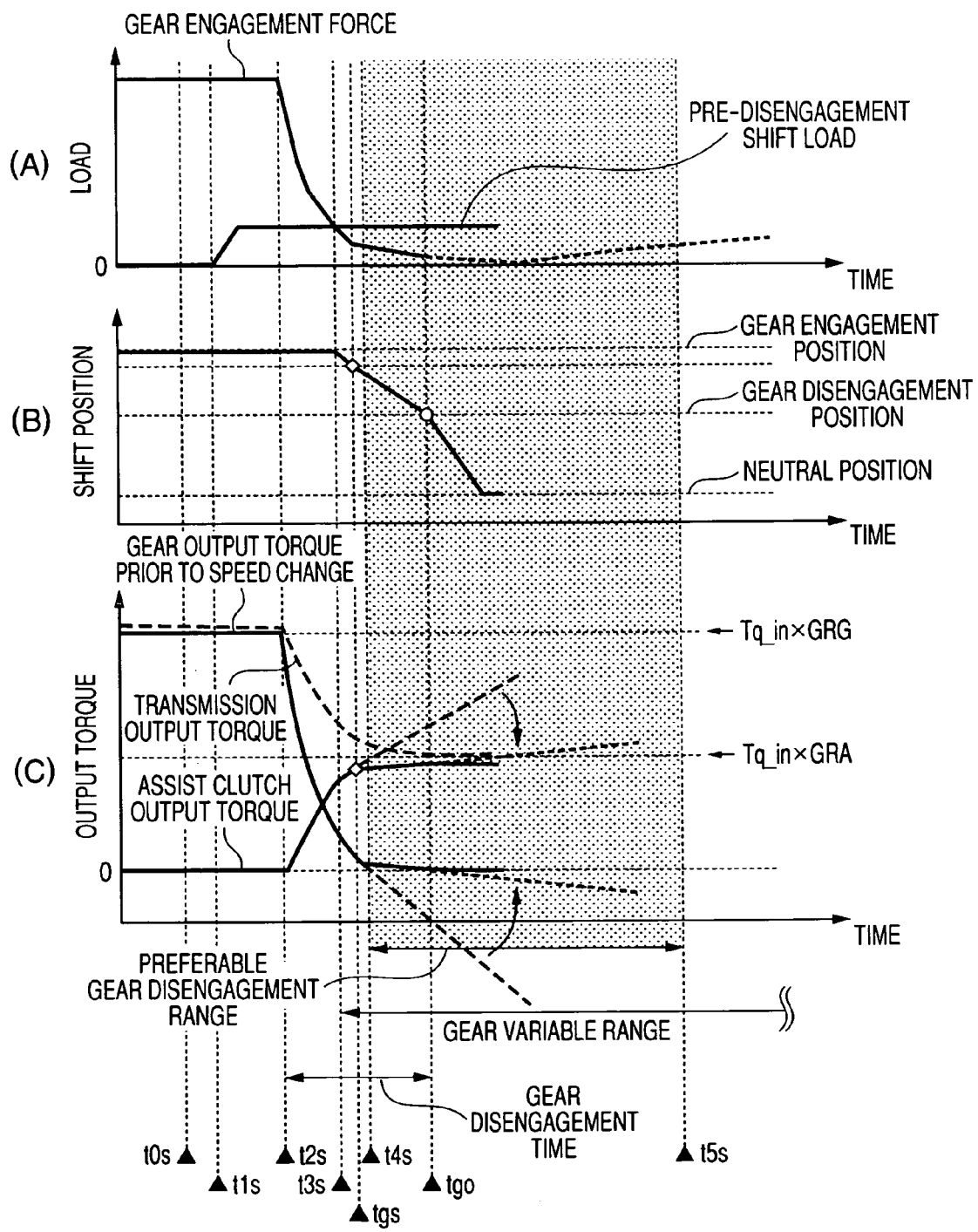
FIG. 1 is a time chart based on the control as an embodiment of the present invention.

FIG. 1 is a time chart based on the control as an embodiment of the present invention.

FIG. 1(A) indicates the load applied to the dog clutch transmission device, FIG. 1(B) shows the shift position, and FIG. 1(C) represents the output torque of the transmission.

Increase of the assist clutch output torque starts at time point t2s. The gear output torque prior to speed change reduces with the increase of the assist clutch output torque. At time point t3s, the gear output torque prior to speed change is reduced below a predetermined value. This reduces the gear engagement force below the pre-disengagement shift load, and starts movement of the engagement transmission mechanism to the direction of disengagement. At time point tgs when the assist clutch transmission torque has been determined to be equivalent to input torque, the assist clutch output torque increase rate is reduced. The gear is disengaged at time point tgo.

In the Figure, the broken line leading from the time point tgs representing the waveform of the assist clutch output torque shows the assist clutch output torque waveform when the assist clutch output torque increase rate immediately before time point tgs is continued. The dotted line leading from the time point tgs of the assist clutch output torque waveform indicates the assist clutch output torque waveform when the assist clutch output torque increase rate immediately before time point tgs is used unchanged.

The broken line leading from the time point tgs of the waveform of the gear output torque prior to speed change indicates the waveform of the gear output torque prior to speed change when the assist clutch output torque increase rate immediately before the time point tgs is used unchanged. The dotted line leading from the time point tgs of the waveform of the gear output torque prior to speed change indicates the waveform of the gear output torque prior to speed change when the assist clutch output torque increase rate immediately after the time point tgs is used unchanged.

At time point tgs when the assist clutch transmission torque is determined to be equivalent to the input torque, the assist clutch output torque increase rate is reduced. Then the gear movable range covers the time duration from the time point t3s when the gear engagement force is reduced below the pre-disengagement shift load, to the time point t6s (not illustrated). The preferable gear disengagement range at this time covers the time duration from the time point t4s when gear transmission torque prior to speed change is reduced below a predetermined level, to the time point t5s. Further, gear disengagement time duration is from time point t2s to time point tgo.

The aforementioned method of control reduces the inclination of the gear output torque prior to speed change at a position close to 0. This arrangement allows both the gear movable range and preferable gear disengagement range to be expanded, whereby the shock resulting from gear disengagement can be minimized.

As described above, a gear transmission transmits torque from the input shaft to the output shaft and contains a plurality of gear pairs and a plurality of dog clutch transmission devices. This gear transmission includes at least two transmission torque variable mechanisms between the output shaft of a power source such as an internal combustion engine and the output shaft of the aforementioned transmission. When the linkage between the aforementioned gear pairs and dog clutch transmission mechanisms is switched from the first to second linkage, the torque is temporarily transmitted through at least one of the aforementioned transmission torque variable mechanisms. In the aforementioned gear transmission, if a speed change command for switching from the first to second linkage has been issued, the amount of increase in the transmission torque of the transmission torque variable mechanism is reduced when the signal representing the operation states of the aforementioned engine, the aforementioned transmission or the vehicle equipped therewith has undergone a change of a predetermined magnitude, at the time of speed change for increasing the transmission torque by the aforementioned transmission torque variable mechanism.

The estimated value for the transmission input torque is corrected at the time of detecting the movement of the dog clutch transmission mechanism forming the first linkage in the direction of disengagement.

The transmission torque variable mechanism is controlled according to the aforementioned transmission input correction value.

Thus, when disengaging the aforementioned dog clutch transmission mechanism of the gear pair for torque transmission in speed change, the rate of increasing the torque to be transmitted through the transmission torque variable mechanism is changed immediately when the signal representing the operation states of the transmission or vehicle equipped therewith has undergone a change of a predetermined magnitude. This arrangement maintains the torque equilibrium suited for gear disengagement and reduces the shock caused by gear disengagement.

The estimated input torque value of the transmission is corrected according to the time of detecting movement of the dog clutch transmission mechanism in the direction of disengagement. This procedure improves the control precision based on the estimated transmission input torque value, and the maneuverability at the time of speed change.

This technology is applicable to all the vehicles using the automated MT, including automobiles and railway cars.

The following describes the specific structure and control method for achieving the above:

Example 1

Figure 4:
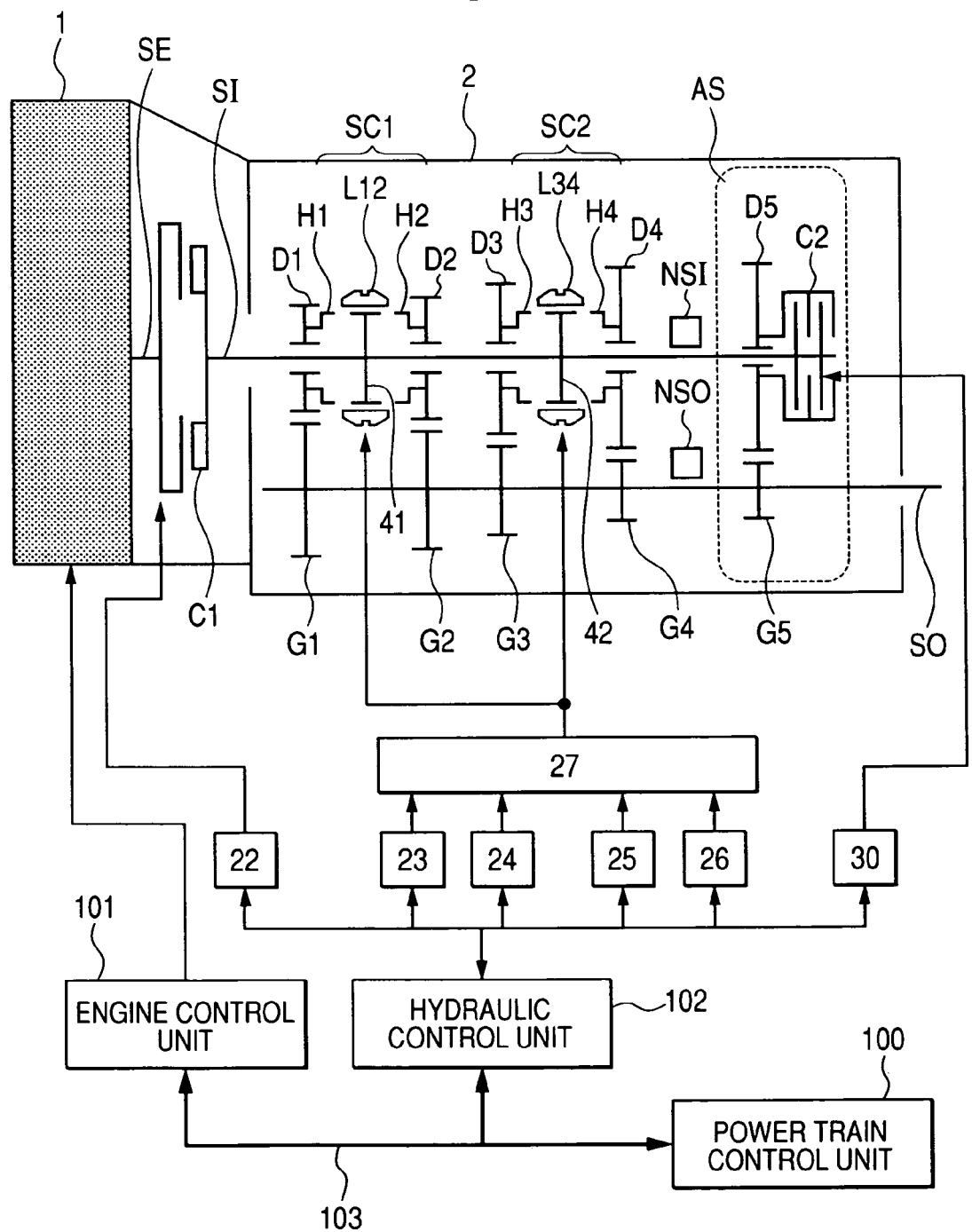
FIG. 4 is an overall schematic diagram of a torque assisted automated MT as an embodiment of the present invention.

FIG. 4 is an overall schematic diagram of a torque assisted automated MT as an embodiment of the present invention. As compared with that of a twin clutch type automated MT, the transmission of this torque assisted automated MT is characterized by compact configuration and light weight as well as a few changes in structures from the existing manual transmission.

The engine 1 as a gasoline engine is equipped with an engine rotating speed sensor (not illustrated) for measuring the speed of the engine 1, and a fuel injection apparatus (not illustrated) for jetting the amount of fuel conforming to the air intake. In the engine 1, high precision control of the output torque is ensured by the air intake, fuel quantity and ignition time being controlled by the engine control unit 101.

The engine 1 is connected with a starting clutch C1 as a dry single disk type friction transmission mechanism. The torque of the engine 1 is transmitted to the transmission input shaft SI or is disconnected by engagement and disengagement of the starting clutch C1.

A hydraulically driven actuator 22 is used to adjust the pressure of the starting clutch C1 (input shaft clutch torque). The output of the engine 1 is transmitted to the input shaft SI or is disconnected by adjusting this pressure.

The transmission input shaft SI is provided with a first drive gear D1, second drive gear D2, third drive gear D3, fourth drive gear D4, fifth drive gear D5, and backward driven gear (not illustrated). A sensor NSI for detecting the rotating speed of the transmission input shaft SI is provided as an input shaft speed detecting mechanism (not illustrated).

The transmission output shaft SO is provided with a first driven gear G1, second driven gear G2, third driven gear G3, fourth driven gear G4, fifth driven gear G5, and backward driven gear (not illustrated). The first driven gear G1 is engaged with first drive gear D1, the second driven gear G2 with second drive gear D2, the third driven gear G3 with third drive gear D3, the fourth driven gear G4 with fourth drive gear D4, the fifth driven gear G5 with fifth drive gear D5, and the backward driven gear with another backward drive gear through a reversing gear (not illustrated).

A first dog clutch transmission mechanism SC1 is arranged between the first drive gear D1 and second drive gear D2. This is the mechanism that engages the first drive gear D1 or second drive gear D2 with the transmission input shaft SI. The torque transmitted from the transmission input shaft SI to the first drive gear D1 or second drive gear D2 through the first dog clutch transmission mechanism SC1 is transmitted to the transmission output shaft SO from the first driven gear G1 or the second driven gear G2.

Similarly, a second dog clutch transmission mechanism SC2 as a dog clutch transmission mechanism is arranged between the third drive gear D3 and fourth drive gear D4.

The backward drive gear is provided with a third dog clutch transmission mechanism (not illustrated) as a dog clutch transmission mechanism for causing engagement between the backward drive gear and the transmission input shaft SI.

To transmit the torque of the transmission input shaft SI to the first dog clutch transmission mechanism SC1, the second dog clutch transmission mechanism SC2 or third dog clutch transmission mechanism, any one of the transmission input shaft SI to the first dog clutch transmission mechanism SC1, second dog clutch transmission mechanism SC2 and third dog clutch transmission mechanism is moved in the axial direction of the transmission input shaft SI, and is engaged with any one of the first drive gear D1, second drive gear D2, third drive gear D3, fourth drive gear D4, and backward drive gear. The first dog clutch transmission mechanism SC1, second dog clutch transmission mechanism SC2 or third dog clutch transmission mechanism is moved by operating a shift/select mechanism 27 using a first shift actuator 23, second shift actuator 24, first select actuator 25, and second select actuator 26.

If any one of the transmission input shaft SI to the first dog clutch transmission mechanism SC1, second dog clutch transmission mechanism SC2 and third dog clutch transmission mechanism is engaged with any one of the first drive gear D1, second drive gear D2, third drive gear D3, fourth drive gear D4, and backward driven gear, the torque of the transmission input shaft SI is transmitted to the transmission output shaft SO through any one of the first dog clutch transmission mechanism SC1, second dog clutch transmission mechanism SC2 and third dog clutch transmission mechanism.

A sensor NSO for detecting the speed of the transmission output shaft SO is provided as the output shaft rotating speed detecting mechanism.

Solenoid valves are used to constitute the first shift actuator 23, second shift actuator 24, first select actuator 25 and second select actuator 26. The shift/select mechanism 27 is composed of a shifter rail and shifter fork. The shift/select mechanism 27 (not illustrated) is preferably provided with a position retaining mechanism for retaining the gear position for prevention of gear from being disconnected during the travel. However, this is not essential.

In the embodiment, a power transmission mechanism AS is provided to transmit the torque of the transmission input shaft SI to the transmission output shaft SO. The transmission output shaft SO is provided with an assist clutch C2. The assist clutch C2 is a friction transmission mechanism as a transmission torque variable mechanism. A wet multiple disk clutch is used in the present embodiment. The friction transmission mechanism in the sense in which it is used here refers to the mechanism of producing friction force by the pressure against the friction surface, whereby torque is transmitted. Engagement with the assist clutch C2 causes the fifth drive gear D2 to be linked with the input shaft SI, and the torque of the transmission input shaft SI is transmitted to the transmission output shaft SO through the fifth driven gear G5 engaged with the fifth drive gear D5.

The pressure of the assist clutch C2 is controlled by the hydraulically driven actuator 30. Adjustment of this pressure allows the output of the engine 1 to be transmitted or disconnected.

The torque of the transmission input shaft SI transmitted to the transmission output shaft SO through the combination between the aforementioned drive gears and driven gears is transmitted to the axle (not illustrated) through the differential gear (not illustrated).

A hydraulic control unit 102 is used to control the input shaft clutch actuator 22 for producing the pressure (input shaft clutch torque) of the starting clutch C1 and the assist clutch actuator 30 for producing the pressure (assist clutch torque) of the assist clutch C2. The hydraulic control unit 102 controls the voltage of the solenoid valve (not illustrated) arranged on each actuator, thereby adjusting the stroke of the hydraulic cylinder (not illustrated) arranged on each actuator, whereby the hydraulic pressure of each actuator is controlled and the transmission torque of each clutch is controlled.

The hydraulic control unit 102 controls the current of the solenoid valves (not illustrated) provided on the first select actuator 25 and second select actuator 26, thereby adjusting the stroke of the hydraulic cylinder (not illustrated) provided on each actuator. Adjustment of this stroke allows the hydraulic pressure of each actuator to be controlled. Thus, any one of the first dog clutch transmission mechanism SC1, second dog clutch transmission mechanism SC2 and third dog clutch transmission mechanism is moved or selected. The hydraulic control unit 102 controls the current of the solenoid valves (not illustrated) arranged on first shift actuator 23 and second shift actuator 24, thereby adjusting the stroke of the hydraulic cylinder (not illustrated) arranged on each actuator, in such a way as to control the hydraulic pressure of each actuator and the loads for operating the first dog clutch transmission mechanism SC1, second dog clutch transmission mechanism SC2 and third dog clutch transmission mechanism.

High precision control of the torque of the engine 1 is ensured by the engine control unit 101 that controls the air intake, fuel quantity and ignition time. The hydraulic control unit 102 and engine control unit 101 are controlled by a power train control unit 100. The power train control unit 100, engine control unit 101, and hydraulic control unit 102 exchange information through communication means 103.

In the present embodiment, hydraulic actuators are used as the input shaft clutch actuator 22 and assist clutch actuator 30. An electric actuator based on a motor and others may be used instead. In this case, the hydraulic control unit 102 is a motor control unit.

A gasoline engine as well as a diesel engine, natural gas engine, motor and others can be used as a drive power source. Further, the present invention is also applicable to a hybrid car using such an engine and motor.

A dry single disk clutch, dry multiple disk clutch, wet dry multiple disk clutch or electromagnetic clutch may be used as the starting clutch C1 and assist clutch C2.

The starting clutch C1 is so called in the sense that the clutch may be used for starting. However, the starting clutch C1 includes all means capable of interrupting the power between the engine and transmission even in an embodiment where the clutch is not used for starting. The assist clutch C2 is so called in the sense that the clutch assists speed change. However, the assist clutch C2 includes all means used to avoid disconnection of torque in an automated MT.

A normally engaged mechanism may be used as the first dog clutch transmission mechanism SC1, second dog clutch transmission mechanism SC2 and third dog clutch transmission mechanism. Alternatively, a clutch provided with a friction transmission mechanism and synchronized, rotated and engaged by a friction transmission mechanism (so-called synchromesh mechanism) can be used as such.

The first shift actuator 23, second shift actuator 24, first select actuator 25 or second select actuator 26 may be composed of a motor driven actuator. The shift/select mechanism 27 may be composed of a shifter rail or shifter fork. A drum type mechanism can also be used.

The first shift actuator 23 and second shift actuator 24 may be composed of one actuator. The first select actuator 25 and second select actuator 26 may be composed of one actuator.

Figure 5:
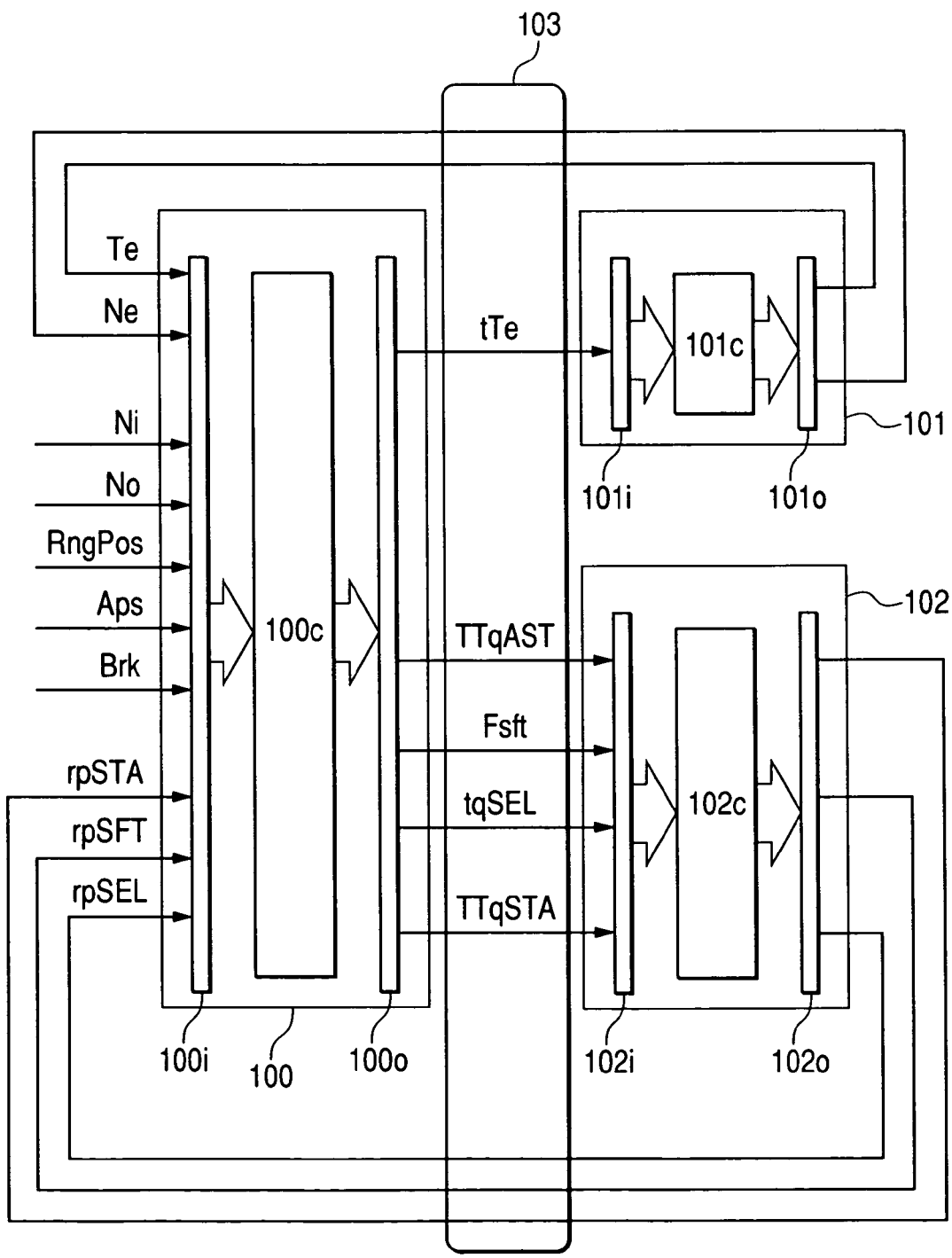
FIG. 5 is the input/output signal relationship based on the communication means 103 linking among the power train control unit 100, engine control unit 101 and hydraulic control unit 102 in FIG. 4.

FIG. 5 is the input/output signal relationship based on the communication means 103 linking among the power train control unit 100, engine control unit 101 and hydraulic control unit 102 in FIG. 4.

The power train control unit 100 is composed as a control unit equipped with an input section 100$i$, output section 100$o$ and computer 100$c$. Similarly, the engine control unit 101 is also composed as a control unit equipped with an input section 101$i$, output section 101$o$ and computer 101$c$. Further, the hydraulic control unit 102 is also composed as a control unit equipped with an input section 102$i$, output section 102$o$ and computer 102$c$.

The engine torque command value tTe is sent from the power train control unit 100 to the engine control unit 101 using the communication means 103. In order to implement the tTe, the engine control unit 101 controls the air intake, fuel quantity and ignition time of the engine 1. Means for determining the engine torque and outputting it by detecting or estimating the engine torque as an input torque to the transmission is arranged inside the engine control unit 101. The rotating speed Ne of the engine 1 and engine torque Te generated by the engine 1 are detected by the engine control unit 101. The result of detection is sent to the power train control unit 100 using the communication means 103. The engine torque detecting means to be used can be a torque sensor or an estimating means using the parameters of the engine such as the injection pulse width of the injector, the pressure inside the intake pipe and engine speed.

The input shaft clutch target torque TTqSTA, target shift load Fsft, target select position tpSEL and assist clutch target torque TTqAST are sent from the power train control unit 100 to the hydraulic control unit 102. To implement the input clutch target torque TTqSTA, the hydraulic control unit 102 controls the input shaft clutch actuator 22 to engage or disengage the starting clutch C1.

The first shift actuator 23, second shift actuator 24, first select actuator 25 and second select actuator 26 are controlled so as to implement the target shift load Fsft and target select position tpSEL. The shift position and select position are controlled by the operation of the shift/select mechanism 27 in this manner, thereby engaging and disengaging the first dog clutch transmission mechanism SC1, second dog clutch transmission mechanism SC2 and third dog clutch transmission mechanism. Further, in order to implement the assist clutch target torque TTqAST, the assist clutch actuator 30 is controlled for engagement and disengagement of the assist clutch C2.

The hydraulic control unit 102 detects the position signal rpSTA representing the engagement and disengagement of the input shaft clutch, shift position signal rpSFT and select position signal rpSEL, and sends the signal to the power train control unit 100.

The input shaft rotating speed Ni and output shaft rotating speed No are inputted into the power train control unit 100 from the input shaft rotation sensor NSI and output shaft rotation sensor NSO. Further, the following signals are also inputted; the range position signal RngPos representing the shift level position such as range P, R, N or D, the signal for accelerator stroke Aps, and the ON/OFF signal Brk from the brake switch for detection to see if the brake has been applied or not. For example, when the driver has set the shift range to D, and has depressed the accelerator, the power train control unit 100 determines that the driver has an intention to start the car or to increase the speed. If the driver has depressed the brake pedal, the power train control unit 100 determines that the driver has an intention to reduced the speed or to stop the vehicle. To fulfill the intention of the driver, the power train control unit 100 sets the engine torque command value tTe, input shaft clutch target torque TTqSTA, target shift load Fsft, and target select position tpSEL. The gear shift step is set from the car speed Vsp calculated from the output shaft rotating speed No and accelerator stroke Aps. Then the engine torque command value tTe, input shaft clutch target torque TTqSTA, target shift load Fsft, and target select position tpSEL and assist clutch target torque TTqAST are set so as to perform the speed change operation to the preset gear shift step.

The power train control unit 100, engine control unit 101 and hydraulic control unit 102 are made up of separate units. However, at least two or all functions can be incorporated into one unit. In this case, the input/output signal by the communication means 103 is replaced by the signal line inside the unit. The control processes to be described below are performed inside the unit having each function.

Figure 6:
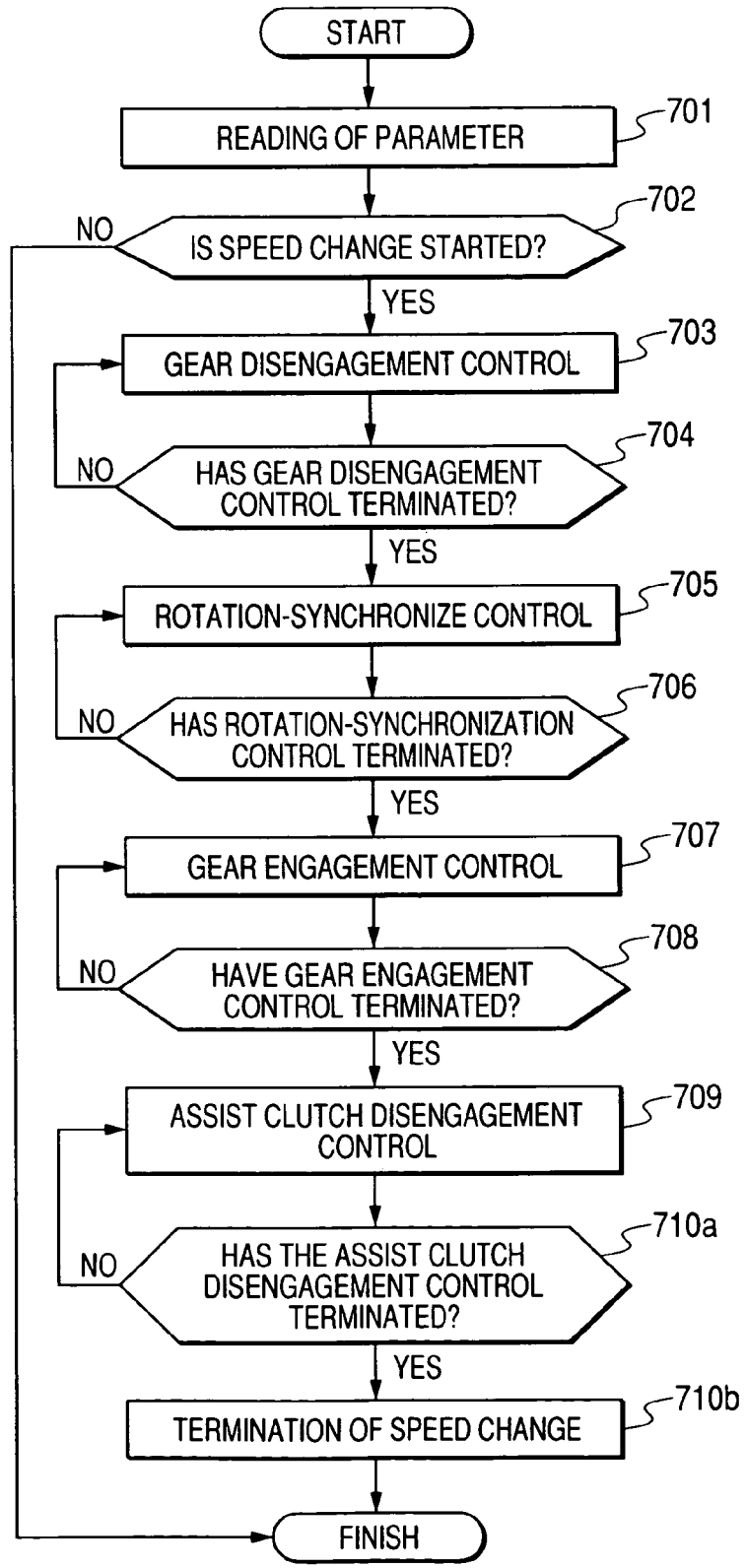
FIG. 6 is an overall flow chart representing the speed change control in the configuration of FIG. 4.

FIG. 6 is an overall flow chart representing the speed change control in the configuration of FIG. 4.

The speed change control shown below is programmed in the computer 100$c$ of the power train control unit 100, and is repeatedly executed at a predetermined time interval.

Some or all the parameters represented by the input/output signal given in FIG. 5 are read in Step 701, and the system proceeds to Step 702.

In Step 702, the gear shift step is determined from the vehicle speed Vsp and accelerator stroke Aps, and decision is made to determine whether or not the current gear shift step should be changed to the next gear shift step. This decision step can be based on the conventional technology, and therefore, will not be described here. If it has been determined that the speed change is not necessary, the system goes to No to terminate this flow chart. If it has been determined that the speed change is necessary, the system follows the step of speed change operation and goes to the Step 703 to disengage the gear.

In Step 703 (gear disengagement control phase), gear disengagement control is executed. In the next Step 704, decision is made to determine if the gear disengagement control has completed or not. If the gear disengagement control has not completed, the system goes back to Step 703. If the gear disengagement control has completed, the system goes to Step 705.

In Step 705 (rotation synchronous control phase), the assist clutch target torque is controlled so that the input rotating speed will be synchronized with a certain target rotating speed at the rotating speed equivalent to the next speed change step. If the rotation synchronous control has not yet completed, the system goes back to Step 705. If the rotation synchronous control has completed, the system goes to Step 707.

In Step 707 (gear engagement control phase), gear engagement control is executed. In the next Step 708, decision is made to determine if the gear engagement control has completed or not. If the gear engagement control has not completed, the system goes back to Step 707. If the gear engagement control has completed, the system goes to Step 709.

In Step 709 (assist clutch torque release control phase), a decision is made to determine if the assist clutch torque release control phase has completed or not. In the next step 710, a decision is made to see if the assist clutch torque release control has terminated or not. If the assist clutch torque release control has not yet terminated, the system goes to Step 709. If the assist clutch torque release control has terminated, the system goes to Step 711.

In Step 711 (speed change completion phase), the speed change control completes.

Figure 7:
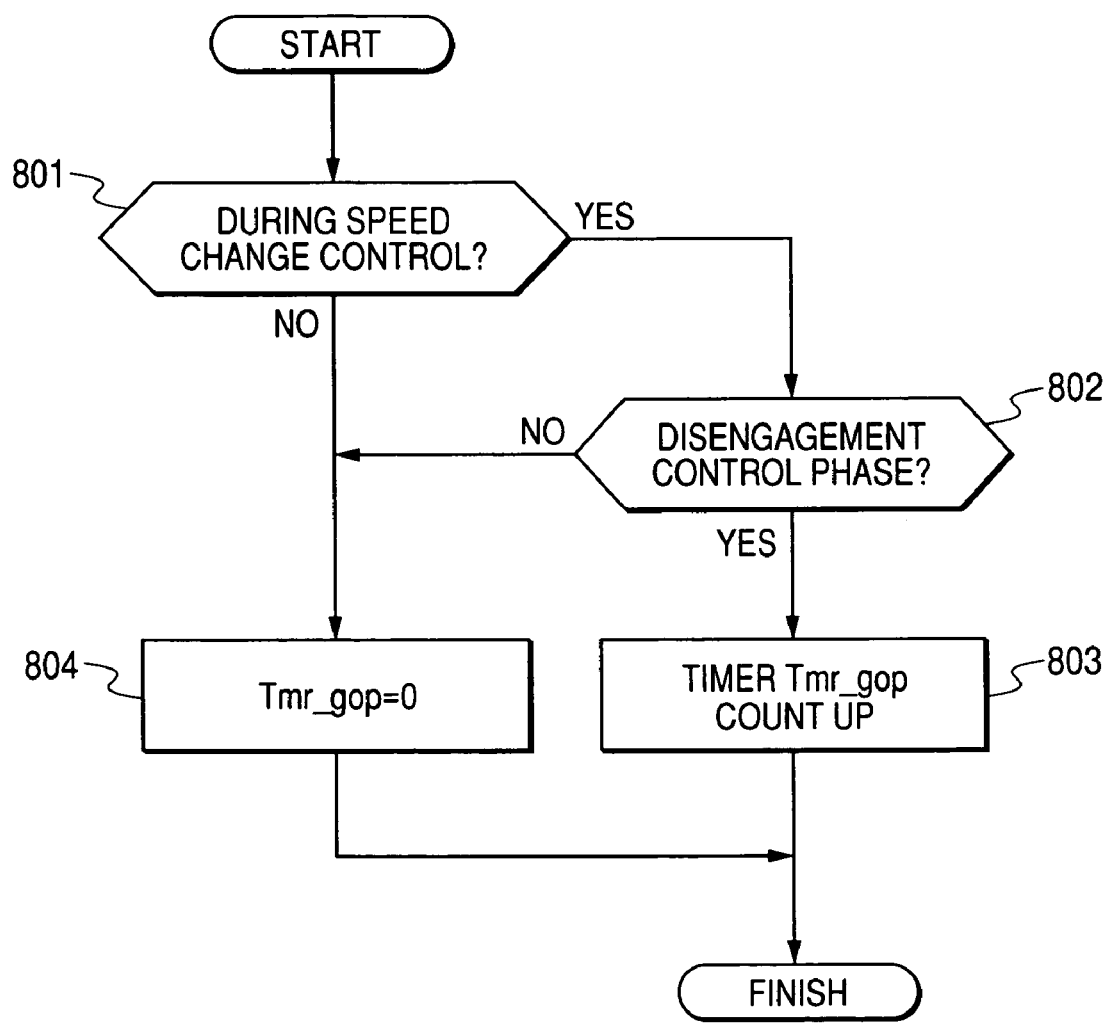
FIG. 7 is a flow chart representing the contents of the timer indicating the passage of time in the speed change control according to the configuration of FIG. 4.

FIG. 7 is a flow chart representing the contents of the timer indicating the passage of time in the speed change control according to the configuration of FIG. 4.

The contents of the timer to be described below are programmed in the computer 110c of the power train control unit 100, and are executed at a predetermined time interval.

In Step 801, decision is made to determine if speed change control is currently being executed or not. If speed change control is not being executed, the system goes to Step 804. Processing terminates after clearing the gear disengagement control timer Tmr_gop. If speed change control is being executed, the system goes to Step 802.

In Step 802, a decision is made to see if disengagement is being performed or not (Step 703 in FIG. 6 indicates the state of disengagement being performed). If disengagement is not being performed, the system goes to the Step 804, and completes the processing after cleaning the gear disengagement control timer Tmr_gop. If disengagement is being performed, the system goes to Step 803.

The gear disengagement control timer Tmr_gop is counted up in Step 803.

Figure 8:
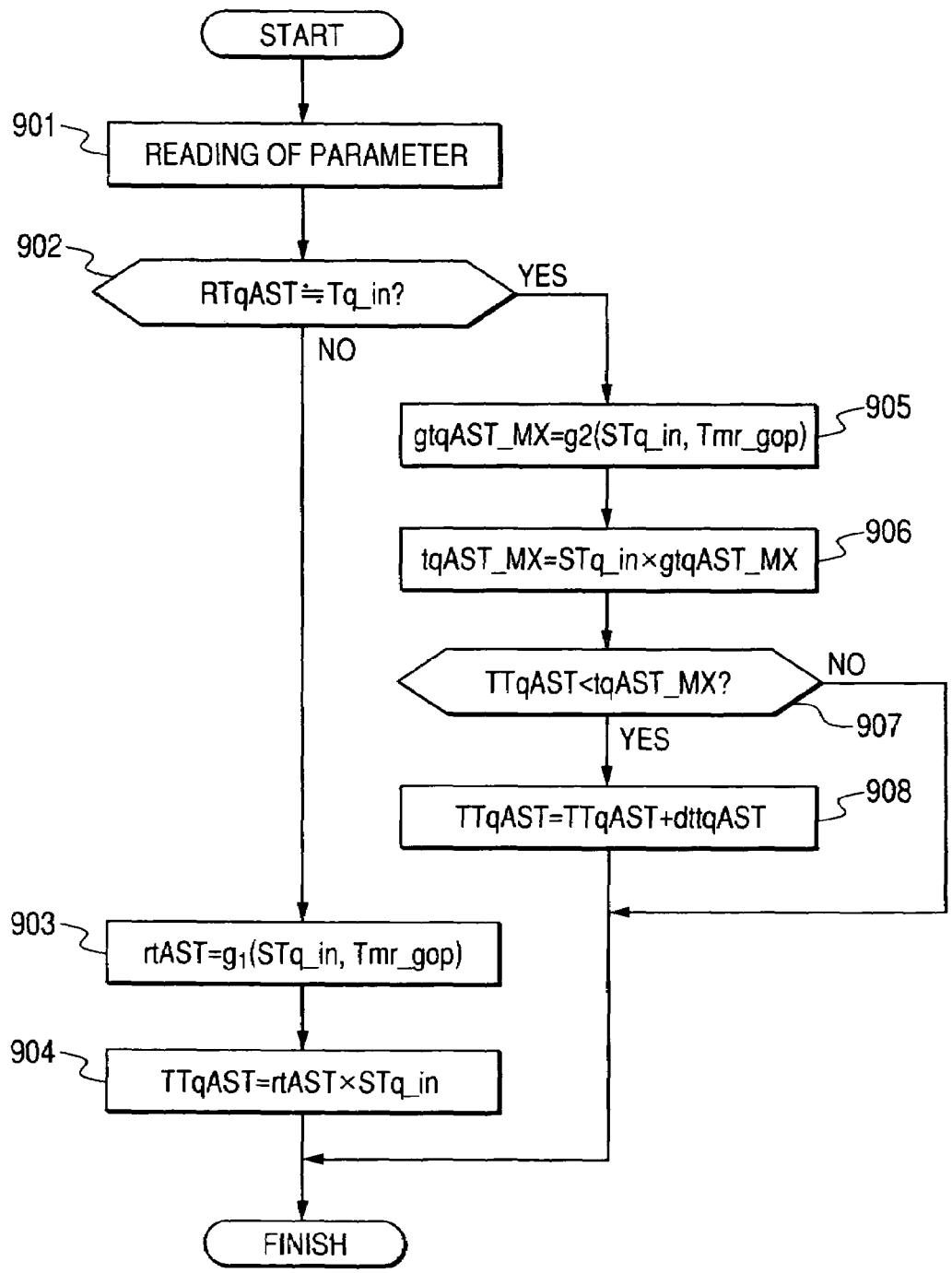
FIG. 8 is a flow chart for assist clutch control to be executed in Step 703 of FIG. 6 (disengagement control phase)

FIG. 8 is a flow chart for assist clutch control to be executed in Step 703 of FIG. 6 (disengagement control phase).

In Step 901, some or all of the parameters expressed by the input/output signal of FIG. 5 are read. After obtaining the data required for the assist clutch actual transmission torque RTqAST and input torque Tq_in, the system goes to Step 902. The assist clutch actual transmission torque RTqAST can be obtained by using the prior art; for example, it can be estimated and calculated by using a torque sensor or a combination of the rotating speed and other parameters, or by obtaining the relationship between the assist clutch stroke and transmission torque according to calculation or a map. Accordingly, the detailed description will be omitted. Further, the input torque Tq_in is obtained by detection or estimation on the side of the engine or on the transmission side.

In Step 902, a decision is made to see if the assist clutch actual transmission torque RTqAST is equal to the input torque Tq_in or not. If the assist clutch actual transmission torque RTqAST is equal to the transmission input shaft torque Tq_in, the system goes to the Step 905. If it is not equal, the system goes to the Step 903. When a decision is made to check if it is equal or not, it is possible to determine that they are "equal" to each other if the difference between the assist clutch actual transmission torque RTqAST and input shaft torque Tq_in is within the predetermined range. The "predetermined range" can be set as follows:

If the effect of reduction in torque difference can be achieved by the application of this embodiment within a certain range, this range can be used as the "predetermined range". The predetermined range can be adjusted, for example, by experiment, or can be determined by experiment or simulation in response to the size of the friction plate, friction coefficient and material eigen value. Further, it can be changed in response to the state of the assist clutch, e.g. temperature at that time, heating value, chronological change and instrumental error.

In Step 903, the assist torque clutch torque increase rate rtAST is obtained from the function g1 (STq_in, Tmr_gop), and the system goes to the Step 904. In this case, the transmission input shaft torque Tq_in can be used directly as the transmission input shaft torque STq_in. Alternatively, an estimated value based on other elements can be used. It is also possible to use the learning value STq_in2 described with reference to FIG. 10. The Tmr_gop is the timer value described with reference to FIG. 7. The contents of the function g1 will be described with reference to FIG. 9.

In Step 904, the assist clutch target torque TTqAST is calculated from the product between the assist clutch torque increase rate rtAST and transmission input shaft torque STq_in calculated in Step 903. Then the processing completes.

In Step 905, the assist clutch target torque upper limit gain gtqAST_MX is calculated based on the function g2 (STq_in), and the system goes to Step 906. The contents of function g2 will be described with reference to FIG. 9.

In Step 906, the assist clutch target torque upper limit tqAST_MX is calculated from the product between the assist clutch target torque upper limit gain gtqAST_MX calculated in Step 905 and the transmission input shaft torque STq_in determined in Step 906.

In Step 907, comparison is made to see if the target assist torque TTqAST is smaller than the assist clutch upper limit torque tqAST_MX or not. If it is not smaller, processing terminates. If the target assist torque TTqAST is smaller than the upper limit torque tqAST_MX, the system goes to Step 908.

In Step 908, the assist clutch target torque increment dttqAST is added to the previous value of the assist clutch target torque TTqAST. In this case, the dttqAST can be set within the range wherein the effect of reducing the torque difference is achieved as a result of applying the present embodiment. The predetermined range can be adjusted, for example, by experiment. It can also be determined by experiment or simulation in response to the size of the friction plate, friction coefficient and material eigen value. Further, it can be changed in response to the state of the assist clutch, e.g. temperature at that time, heating value, chronological change and instrumental error.

In Step 902, comparison was made between the assist clutch actual torque RTqAST and the transmission input shaft torque Tq_in, a decision was made to see if assist clutch transmission torque is equivalent to the input torque or not.

Instead, it is also possible to use the input shaft rotating speed change, vehicle acceleration, output shaft torque and output shaft rotating speed change. When the input shaft rotating speed change is used, if the input shaft rotating speed has reached the threshold value (e.g. the rotating speed assumed subsequent to the assist clutch and the rotating speed assuming the gear ratio between the fifth drive gear D5 and the fifth driven gear G5 in the rotating speed), a decision is made to see whether or not the assist clutch transmission torque is equivalent to the input torque, based on the fact that the input shaft rotating speed change is reduced below the threshold value. This procedure also applies to the output shaft rotating speed change. When the vehicle acceleration is used, for example, the vehicle threshold value when the assist clutch transmission torque is equivalent to the input torque is obtained as the threshold value in advance. The result is compared with the actual vehicle acceleration. This procedure also applies to the output shaft torque. For example, the output shaft torque when the assist clutch transmission torque is equivalent to the input torque is obtained as the threshold value. This is compared with the actual output shaft. Further, a decision can also be made using the behaviors of the input shaft rotating speed change, vehicle acceleration, output shaft torque and output shaft rotating speed change when the assist clutch transmission torque is equivalent to the input torque.

FIG. 9 shows the configuration of the function for calculating the assist clutch torque increase rate rtAST and assist clutch torque upper limit gain gtqAST_MX of FIG. 8.

Figure 9A:
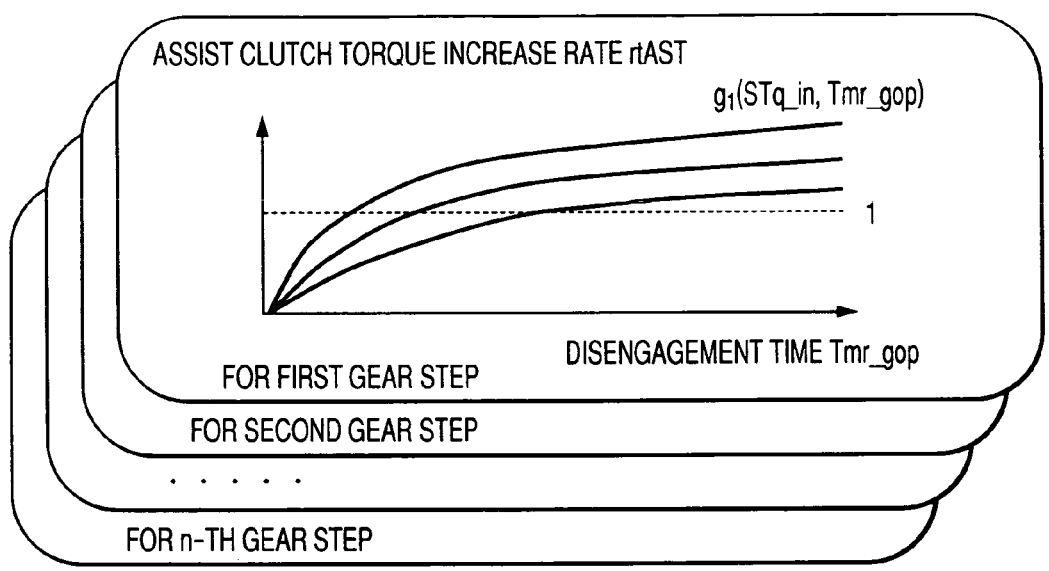
FIG. 9A shows the configuration of the function for calculating the assist clutch torque increase rate rtAST of FIG. 8.

FIG. 9A shows an example of the set value of the function g1 in Step 903 of FIG. 8. The set value of the function g1 in Step 903 of FIG. 8 is set in such a way as to be increased with the progress of the gear disengagement control timer Tmr_gop. Further, in this Figure, the set value of the function g1 is set for each transmission input shaft torque STq_in. This is a preferable form of example. It is also possible to use the unique data determined by the representative value of the transmission input shaft torque STq_in. Further, it can be set separately for each of the automatic mode and manual mode for each gear shift step.

Figure 9B:
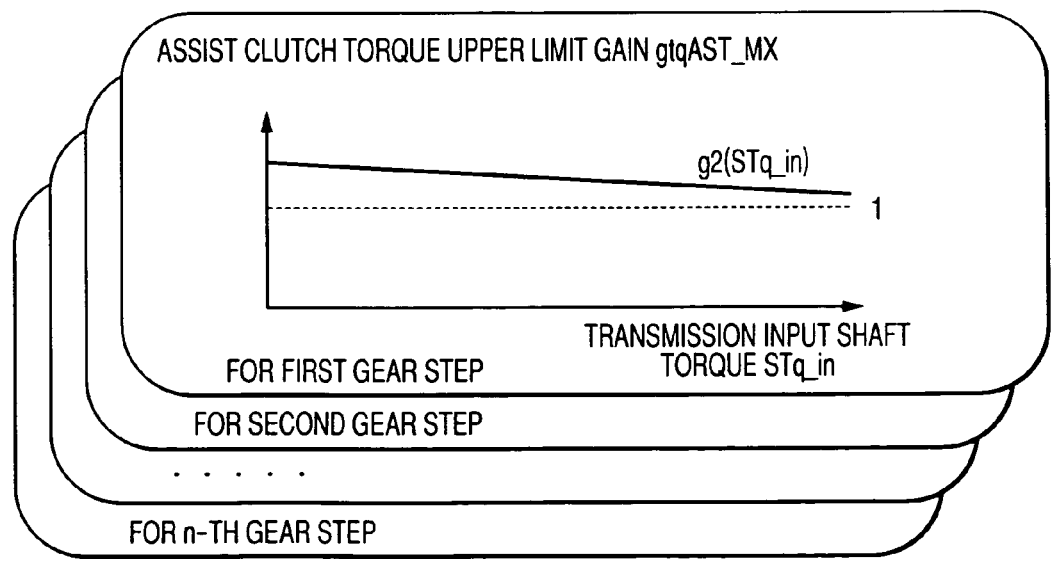
FIG. 9B shows the assist clutch torque upper limit gain gtqAST_MX of FIG. 8.

FIG. 9B shows an example of the set value of the function g2 in Step 905 in FIG. 8. The set value of the function g2 in Step 905 in FIG. 8 is preferably set to a greater value with the progress of transmission input shaft torque STq_in. Further, it can be set separately for each of the automatic mode and manual mode for each gear shift step.

FIG. 10 is an time chart representing the up shift as an example of FIG. 4. FIG. 10(A) shows the rotating speed of the transmission input shaft SI, and FIG. 10(B) represents positions (shift positions) of the third dog clutch transmission mechanism L12 and second dog clutch transmission mechanism L34. FIG. 10(C) indicates the gear output torque prior to speed change, assist clutch output torque and gear output torque subsequent to speed change, and (D) shows the transmission output shaft SO.

The time from the time point t0 through t4 corresponds to the gear disengagement phase, and the time from t4 through t5 refers to the rotation synchronization phase. The time from t5 through t6 represents the gear engagement phase and time from t6 through t7 indicates the assist torque release phase. Further, the time from time point t0 through t3 corresponds to the time from t0s through tgo in FIG. 1.

At time point t1, the assist clutch output torque starts to rise. As the assist clutch output torque rises, the gear output torque prior to speed change reduces. At time point t2 when the movement of the gear in the direction of disengagement has been detected, the assist clutch output torque increase rate is reduced. At time point t3, the gear is disengaged. From time point t4 when the gear comes closer to the neutral point, the rotation synchronization control starts using the assist clutch, whereby the input shaft rotating speed is rotation-synchronized to the next gear shift step (time points t4 through t5 in (A)). When the input shaft rotating speed has reached the level corresponding to the next gear shift step, the gear is switched to the next shift step (time points t5 through t6 in (B)). When the gear has reached the next gear shift step, the release of the assist clutch output torque starts. Then with the release of the assist clutch output torque is transmitted in the next gear shift step. In the final phase, the torque is transmitted only in the next gear (time points t6 through t7 in (C)). The speed change terminates at time point t8.

FIG. 11 is the time short at the time of down shift in the Example of FIG. 4. The definition of (A) through (D) is the same as that of FIG. 10. The time period from t0 through t2 corresponding to the time period from t0s through t5s in FIG. 1.

Rise of the assist clutch output torque starts at time point t1. As the assist clutch output torque rises, the gear output torque prior to speed change reduces. At time point t2, the gear disengagement and movement are detected, the assist clutch output torque increase rate is reduced. After that, gear disengagement is carried out (time point t3 in (B)). From time point t4 when the gear comes closer to the neutral point, the rotation synchronization control starts using the assist clutch, whereby the input shaft rotating speed is rotation-synchronized to the next gear shift step (time points t4 through t5 in (A)). When the input shaft rotating speed has reached the level corresponding to the next gear shift step, the gear is switched to the next shift step (time points t5 through t6 in (B)). When the gear has reached the next gear shift step, the release of the assist clutch output torque starts. Then with the release of the assist clutch output torque, torque is transmitted in the next gear shift step. In the final phase, the torque is transmitted only in the next gear (time points t6 through t7 in (C)). The speed change terminates at time point t8.

Figure 12:
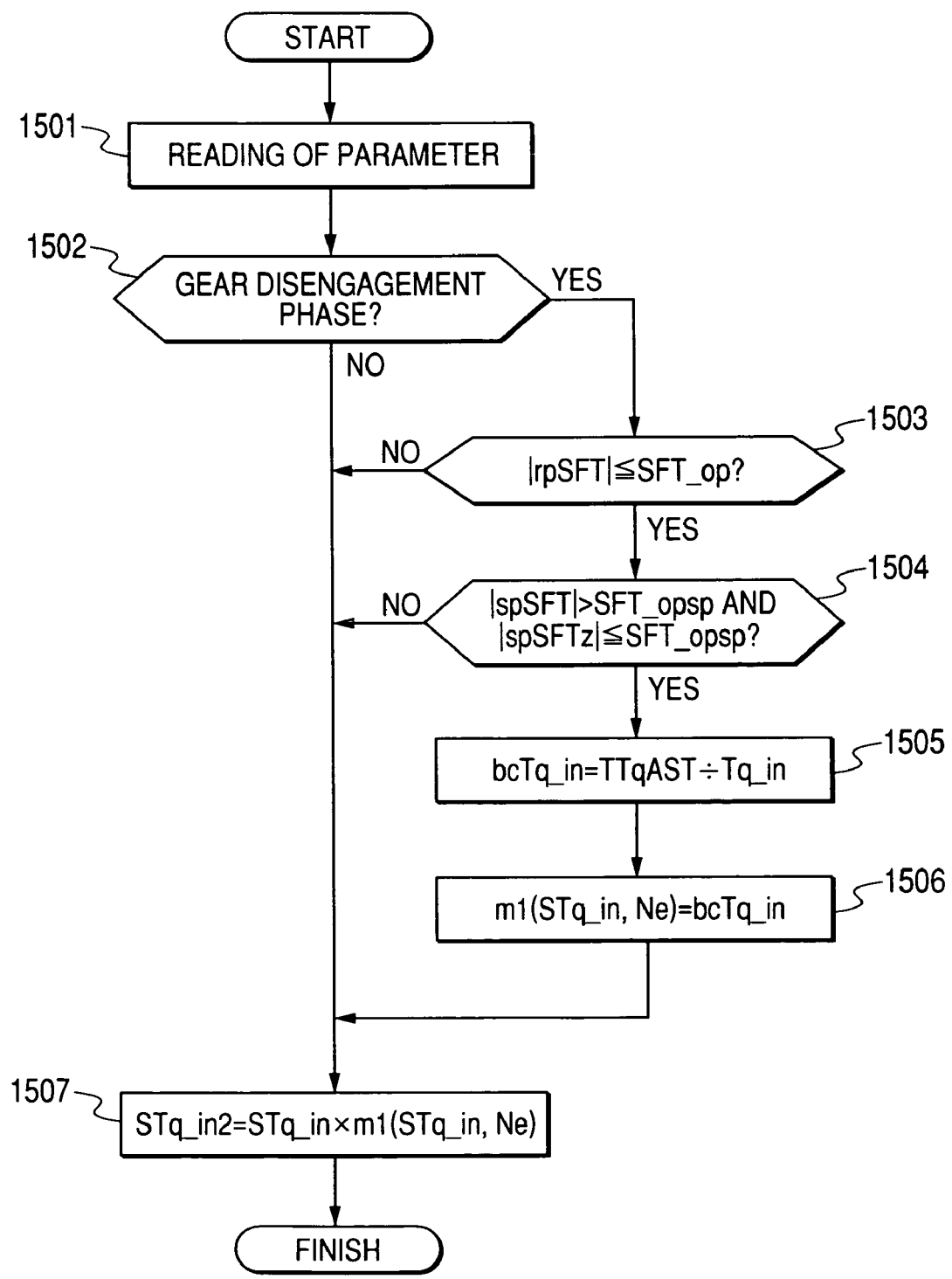
FIG. 12 is a flow chart for learning correction of the transmission input shaft torque STq_in used in FIG. 8.

FIG. 12 is a flow chart for learning correction of the transmission input shaft torque STq_in used in FIG. 8. This learning correction is not essential, but is preferably adopted.

In Step 1501, the parameter is read and the system goes to the Step 1502.

In Step 1502, a decision is made to check if the current phase is the gear disengagement phase. In the gear disengagement phase, the system goes to Step 1503. If the current phase is not the gear disengagement phase, the system goes to Step 1507.

In Step 1503, a decision step is taken to see whether or not the dog clutch transmission members such as the first dog clutch transmission mechanism SC1, second dog clutch transmission mechanism SC2 and third dog clutch transmission mechanism (or clutch and balk ring) are located within a predetermined range SFT_op. If they are not located within the predetermined range SFT_op, the system goes to Step 1507.

When the dog clutch transmission mechanism is engaged and the aforementioned pre-disengagement shift load is applied, the aforementioned "predetermined range SFT_op" is preferably set in such a way not to include the range of movement when the member is moved by the deflection of the member and insufficient depth of engagement before the assist clutch transmission torque is balanced with the input torque.

In Step 1504, a decision is made to see whether or not the dog clutch transmission member movement speed spSFT is greater than a predetermined speed SFT_opsp and the previous value spSFTz of the movement speed of the dog clutch transmission member is smaller than a predetermined speed SFT_opsp. If this condition has been met, the system goes to Step 1505. If this condition is not met, the system goes to Step 1507. The predetermined speed SFT_opsp is preferably set to a value that ensures detection to be performed with stable movement for disengagement.

In Step 1505, the assist clutch target torque TTqAST is divided by the input torque Tq_in to calculate the learning correction value bcTq_in.

In Step 1506, the bcTq_in obtained in Step 1505 is loaded to the learning correction map m1 to be described with reference to FIG. 11.

In Step 1507, the post-learning estimated input torque STq_in2 is calculated by multiplying the learning correction map m1 by the estimated input torque STq_in. It is used instead of the estimated input torque STq_in when the subsequent assist clutch target torque TTqAST is calculated, whereby the assist clutch target torque TTqAST can be corrected.

Figure 13:
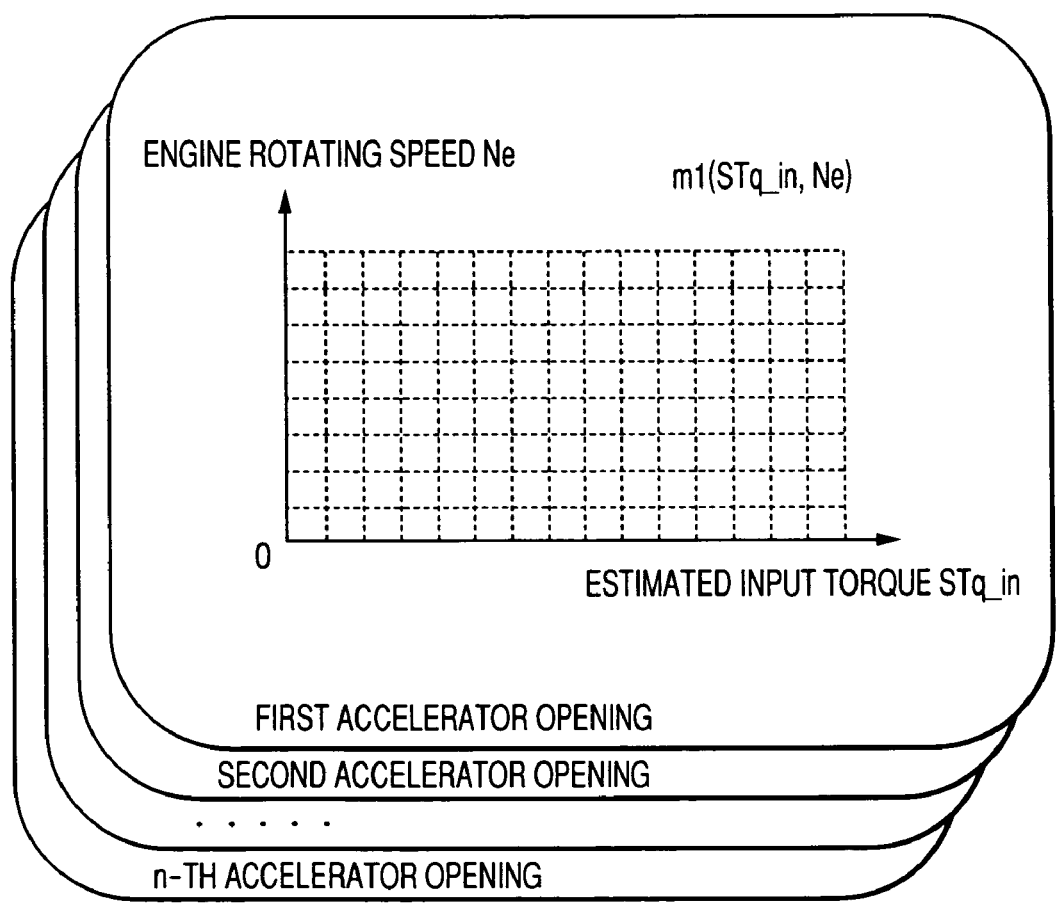
FIG. 13 shows an example of the structure of the input torque correction map m1 of Step 1506 in FIG. 12.

FIG. 13 shows an example of the structure of the input torque correction map m1 of Step 1506 in FIG. 12.

The structure of the input torque correction map m1 in Step 1506 is preferably formed as that of the estimated input torque STq_in and engine rotating speed Ne. Further, setting may be provided according to each parameter indicating the accelerator opening and other engine operation states.

Example 2

The following describes the second Example.

Figure 14:
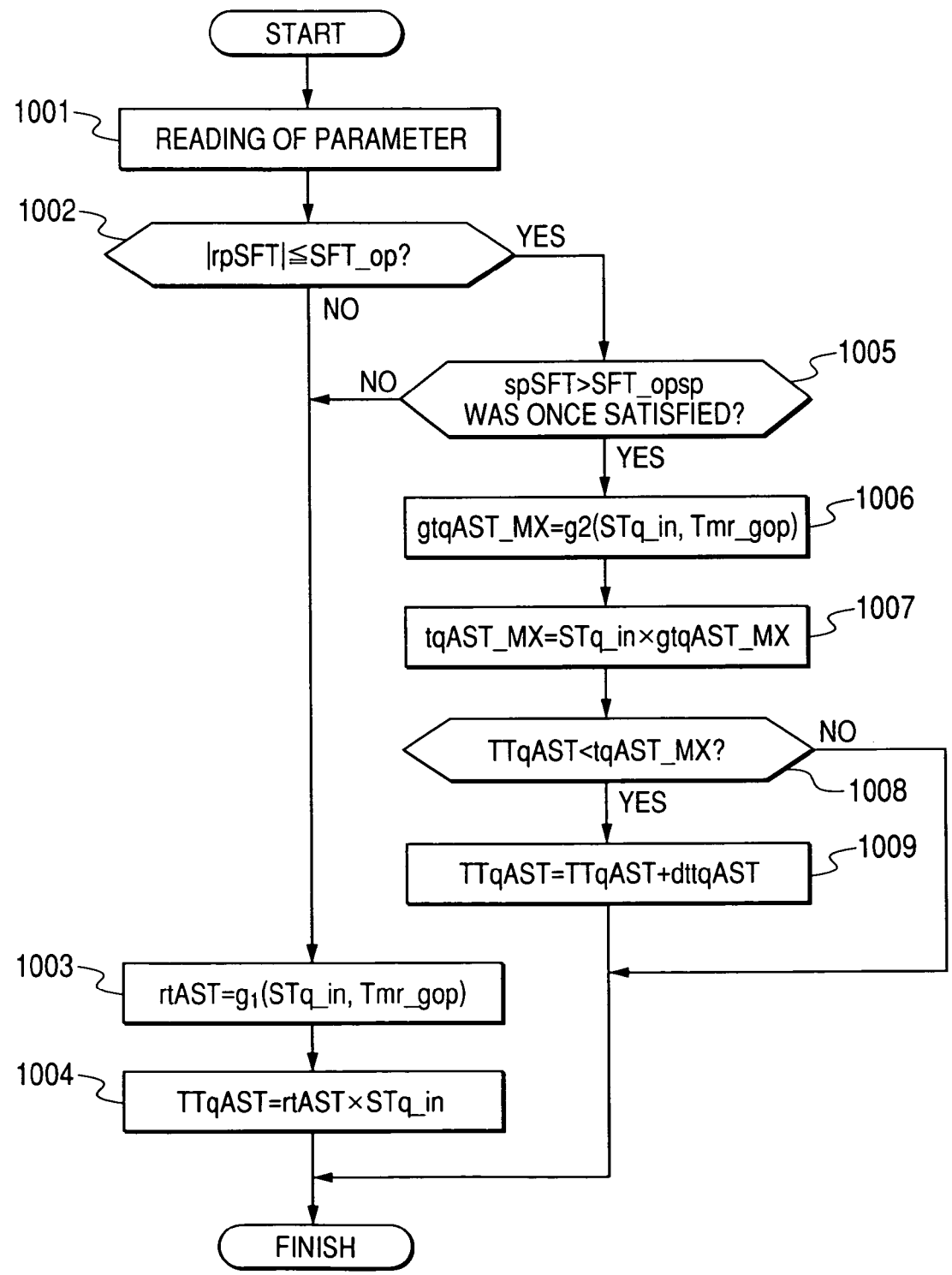
FIG. 14 is another example of the flow chart of the assist clutch control to be implemented in the Step 703 of FIG. 6 (disengagement control phase)

FIG. 14 is another example of the flow chart of the assist clutch control to be implemented in the Step 703 of FIG. 6 (disengagement control phase). The meanings and definitions of other structures, controls and reference numerals are the same as those described with reference to Example 1.

Parameters are read in Step 1001.

In Step 1002, comparison is made to check whether or not the actual shift position is within a predetermined shift position SFT_op. If the actual shift position is not within a predetermined shift position SFT_op, the system goes to Step 903. If the actual shift position is within a predetermined shift position SFT_op, the system goes to Step 1005. The range of the aforementioned predetermined shift position SFT_op should be set in such a way as to ensure that, when the pre-disengagement load is applied in the state of gear engagement, this range will not include the range of movement when the shift position is displaced by either the deflection of the member or deviation of engagement before the assist clutch transmission torque reaches the torque equilibrium point. This is intended to ensure separation from the shift movement when the assist clutch transmission torque has reached the torque equilibrium point.

In Step 1003, the assist clutch torque increase rate rtAST is calculated based on the function g1, and the system goes to Step 1004.

In Step 1004, the assist clutch target torque TTqAST is calculated based on the product between the assist clutch torque increase rate rtAST having been calculated in Step 1003 and the transmission input shaft torque STq_in.

In Step 1005, comparison is made to see whether or not the actual shift speed having been calculated from the actual shift position is equal to or greater than a predetermined shift speed SFT_opsp. If the actual shift speed having been calculated from the actual shift position is equal to or greater than a predetermined shift speed SFT_opsp, the system goes to Step 1006. If not, the system goes to Step 1003.

In Step 1006, the assist clutch target torque upper limit gain gtqAST_MX is calculated based on the function g2.

In Step 1007, the assist clutch target torque upper limit tqAST_MX is calculated based on the product between the assist clutch target torque upper limit gain gtqAST_MX calculated in Step 1006 and the transmission input shaft torque STq_in.

In Step 1008, comparison is made to see whether or not target assist torque TTqAST is smaller than the assist clutch upper limit torque tqAST_MX calculated in Step 1007. If it is smaller, the system goes to Step 1009.

In Step 1009, the assist clutch target torque increment dttqAST is added to the previous value for the assist clutch target torque.

This Example provides an advantage of minimizing the control fluctuation resulting from a chronological change or instrumental error.

Example 3

The following describes the Example 3.

Figure 15:
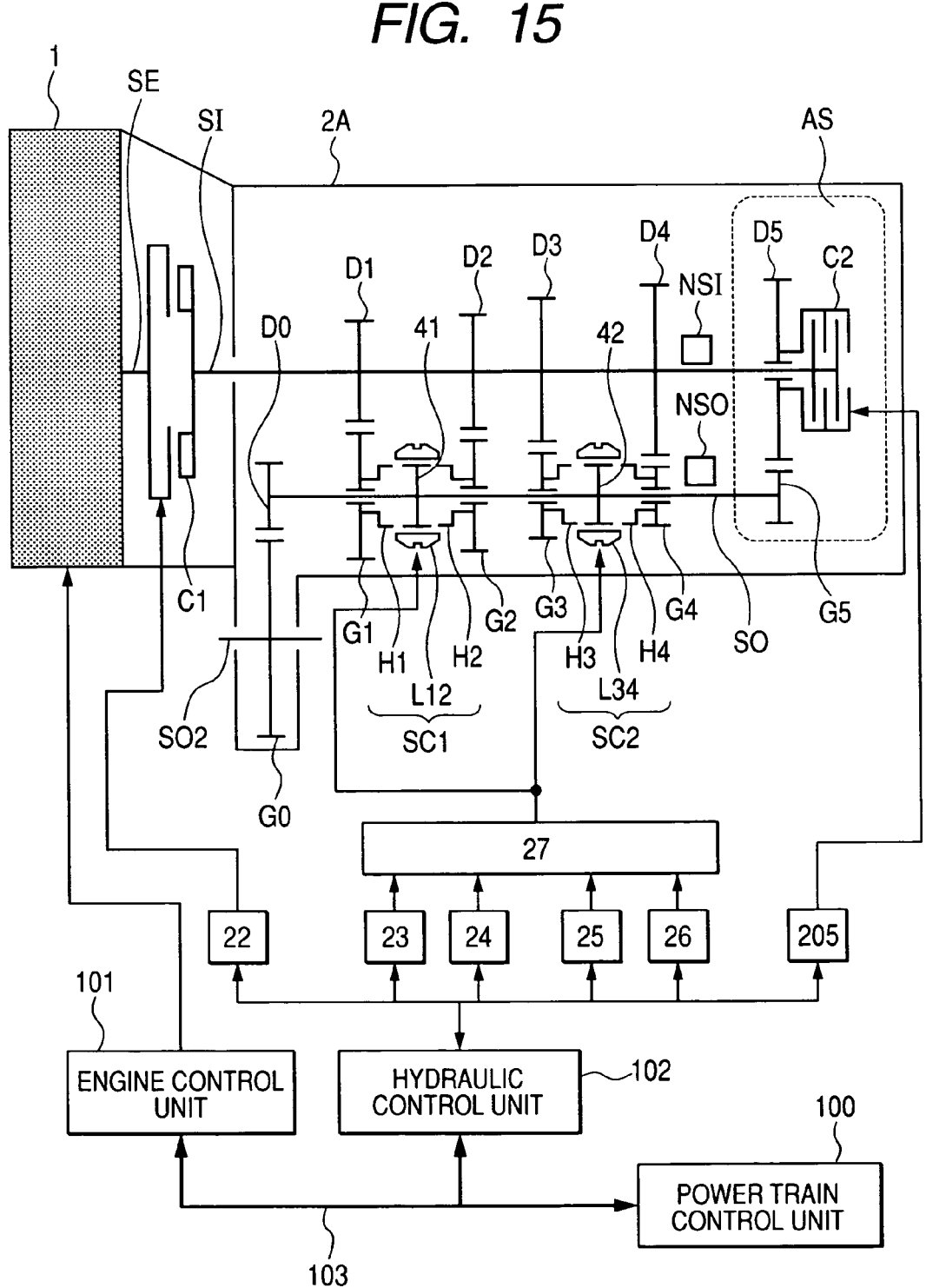
FIG. 15 shows another example of the structure different from that of FIG. 4 in Example 1.

FIG. 15 shows another example of the structure different from that of FIG. 4 in Example 1. The meanings and definitions of other structures, controls and reference numerals are the same as those described with reference to Example 1. Further, a combination of this Example with the Example 2 is also possible.

In this Example, the first speed change clutch SC1 and second speed change clutch SC2 are arranged on the side of the driven gear on the transmission output shaft SO.

A transmission external output shaft SO2 is arranged in parallel with the transmission output shaft SO.

The transmission output shaft SO is provided with an output drive gear DO. The output drive gear DO is engaged with the output driven gear G0 arranged on the transmission external output shaft SO2 of the transmission 2A. A differential reduction gear may be used instead of the output driven gear G0 and output drive gear DO.

The present Example is preferably applied to a front-wheel-drive vehicle.

Example 4

Figure 16:
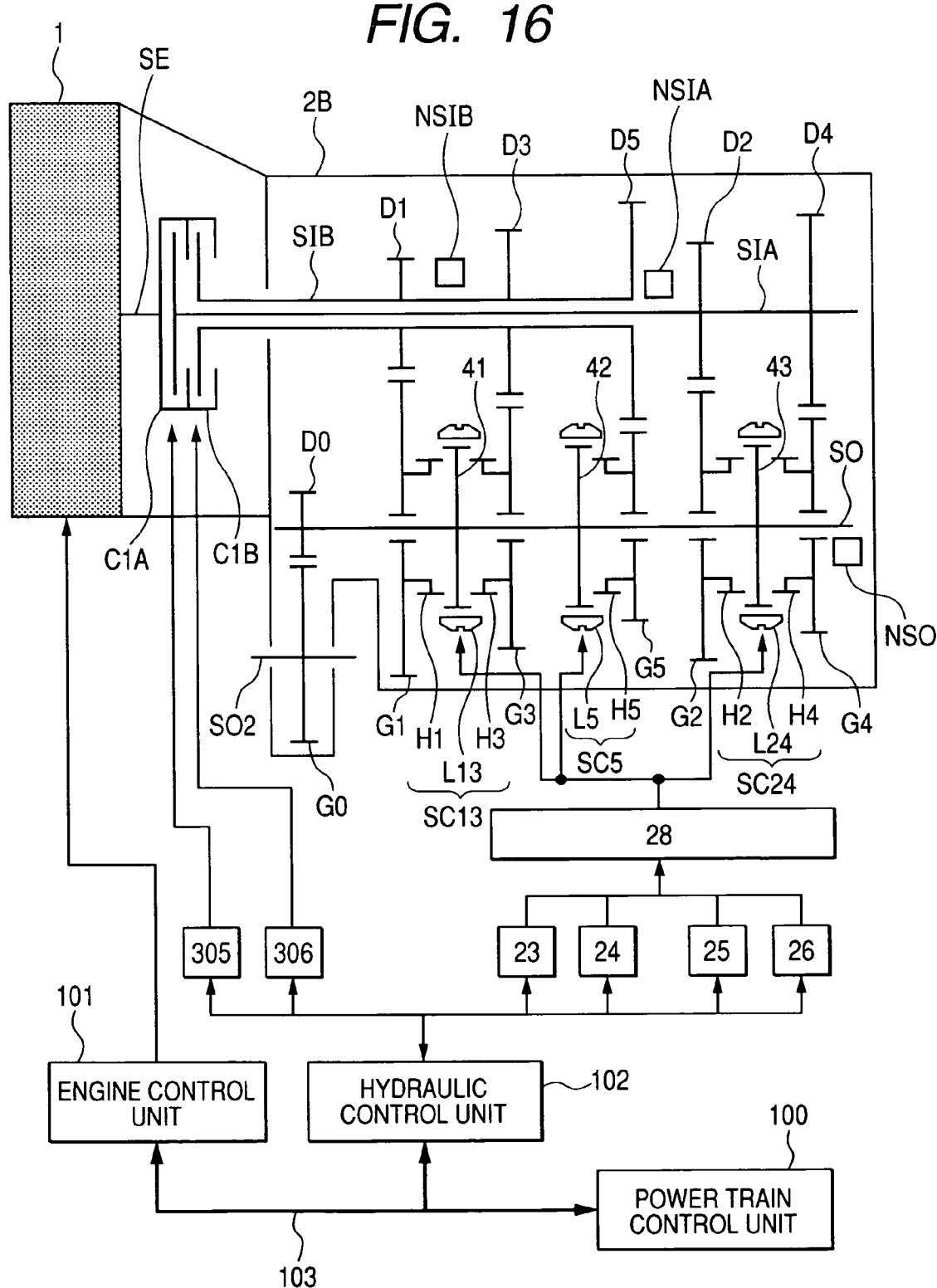
FIG. 16 is an overall schematic diagram representing the twin clutch automated MT as an embodiment the present invention.

The following describes the Example 4:

FIG. 16 shows another example of a structure different from that in FIG. 4 in the first Example. The meanings and definitions of other structures, controls and reference numerals are the same as those described with reference to Example 1. Further, a combination of this Example with the Example 2 is also possible.

The difference from FIG. 4 is that, whereas the torque of the engine 1 is transmitted to the transmission input shaft SI by the engagement of the starting clutch C1 given in FIG. 4, a twin clutch is employed in the present Example. To be more specific, the torque of the engine 1 is transmitted to the first transmission input shaft SIA by the engagement of the first input shaft clutch C1A, and the torque of the engine 1 is transmitted to the second transmission input shaft SIB by the engagement of the second transmission input shaft C1B.

The second transmission input shaft SIB is designed in a hollow structure. The first transmission input shaft SIA is led through the hollow portion of the second transmission input shaft SIB so that relative movement can be performed in the direction of rotation with respect to the second transmission input shaft SIB.

The second transmission input shaft SIB is fixedly provided with the first drive gear D1, third drive gear D3 and fifth drive gear D5 and is rotatably arranged with respect to the first transmission input shaft SIA. The first transmission input shaft SIA is fixedly provided with the second drive gear D2 and fourth drive gear D4, and is rotatably arranged with respect to the second transmission input shaft SIB. The engagement and disengagement of the first input shaft clutch C1A are provided by the first actuator 305 of the input shaft clutch. The engagement and disengagement of the second input shaft clutch C1B are provided by the second actuator 306 of the input shaft clutch.

A first speed change clutch SC13 for engaging the first driven gear G1 with the transmission output shaft SO and for engaging the third driven gear G3 with the transmission output shaft SO is arranged between the first driven gear G1 and third driven gear G3. The torque transmitted from the first drive gear D1 or third drive gear D3 to the first driven gear G1 and third driven gear G3 is transmitted to the first speed change clutch SC13 and is then sent to the transmission output shaft SO through the first speed change clutch SC13.

A third dog clutch SC24 for engaging the second driven gear G2 with the transmission output shaft SO and for engaging the fourth driven gear G4 with the transmission output shaft SO is arranged between the second driven gear G2 and fourth driven gear G4. Thus, the torque transmitted from the second drive gear D2 or fourth drive gear D4 to the second driven gear G2 or fourth driven gear G4 to the third dog clutch SC24, and is sent to the transmission output shaft SO through the third dog clutch SC24.

The fifth driven gear G5 is provided with a second dog clutch SC5 for engaging the fifth driven gear G5 with the transmission output shaft SO. The torque transmitted from the fifth drive gear D5 to the fifth driven gear G5 is transmitted to the second dog clutch SC5 and is transmitted to the transmission output shaft SO through the second dog clutch SC5.

To transmit the torque of the first transmission input shaft SIA and second transmission input shaft SIB to the first dog clutch SC13, second dog clutch SC5 and third dog clutch SC24, any one of the first dog clutch SC13, second dog clutch SC5 and third dog clutch SC24 must be moved in the axial direction, and must be connected with the first driven gear G1, second driven gear G2, third driven gear G3, fourth driven gear G4 and fifth driven gear G5. For this purpose, the first dog clutch SC13, second dog clutch SC5 and third dog clutch SC24 must be moved. To move the first dog clutch SC13, second dog clutch SC5 and third dog clutch SC24, the first shift actuator 23, second shift actuator 24, first select actuator 25 and second select actuator 26 are moved to operate the shift/select mechanism 28.

Assume, for example, that the first gear shift step refers to the case where torque is transmitted to the transmission output shaft SO by the first drive gear D1 and first driven gear G1; the third gear shift step refers to the case where torque is transmitted to the transmission output shaft SO by the third drive gear D3 and third driven gear G3; and the fourth gear shift step refers to the case where torque is transmitted to the transmission output shaft SO by the fourth drive gear D4 and fourth driven gear G4. In the up-shift speed change from the first gear shift step to the third gear shift step, and the down-shaft speed change from the third gear shift step to the first gear shift step, the first input shaft clutch CIA is disengaged and the third dog clutch SC24 and fourth driven gear G4 are engaged. Under this condition, the same control as that of the assist clutch and shift in the embodiment given in FIG. 4 is performed, whereby speed change is carried out.

Assume, for example, that the second gear shift step refers to the case where torque is transmitted to the transmission output shaft SO by the second drive gear D2 and second driven gear G2; the fourth gear shift step refers to the case where torque is transmitted to the transmission output shaft SO by the fourth drive gear D4 and fourth driven gear G4; and the fifth gear shift step refers to the case where torque is transmitted to the transmission output shaft SO by the fifth drive gear D5 and fifth driven gear G5. In the up-shift speed change from the second gear shift step to the fourth gear shift step and the down-shift speed change from the fourth gear shift step to the second gear shift step, the second input shaft clutch C1B is disengaged and the second dog clutch SC5 and fifth driven gear D5 are engaged. Under this condition, the same control as that of the assist clutch and shift in the embodiment given in FIG. 4 is performed, whereby speed change is carried out.

Thus, the same control as that described in the Example 1 is applicable to the case of stepped speed change of twin clutch automated MT as described above.

FIG. 17 represents the torque transmission path of the transmission shown in FIG. 16.

The path from the output shaft of the engine 1 given in FIG. 16 to the two clutches—C1A and C1B—and two input shafts SIA, SIA are represented in parallel. In actual practice, they are arranged coaxially, as shown in FIG. 16.

Figure 17A:
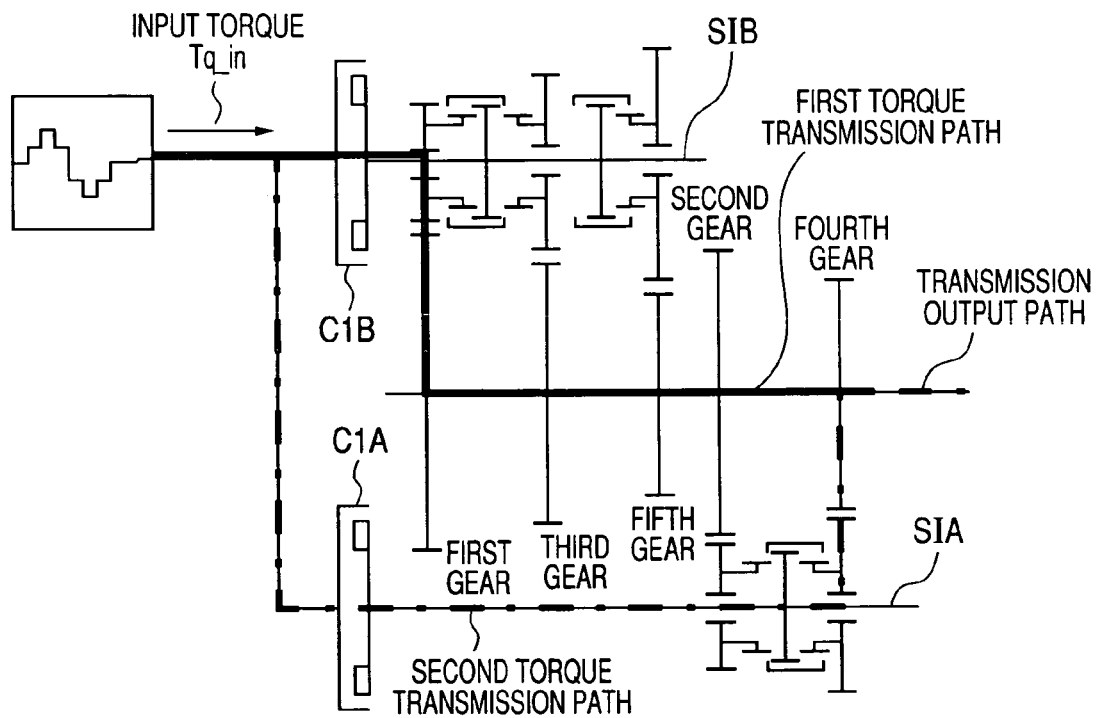
FIG. 17A indicates the torque transmission path for gear disengagement when speed is changed from the first to the third gear shift step, by way of an example.

FIG. 17A indicates the torque transmission path for gear disengagement when speed is changed from the first to the third gear shift step, by way of an example.

In FIG. 17A, the torque transmission path (solid line in FIG. 17A) for transmission of torque from the output shaft of the engine 1 to the output shaft of the transmission through the clutches C1B and the gear train on the input shaft SIB corresponds to the torque transmission path given in FIG. 3. The torque transmission path (one-dot chain line in FIG. 17A) for transmission of torque from the output shaft of the engine 1 to the output shaft of the transmission through the clutches C1A and the gear train on the input shaft SIA corresponds to the second torque transmission path given in FIG. 3.

Figure 17B:
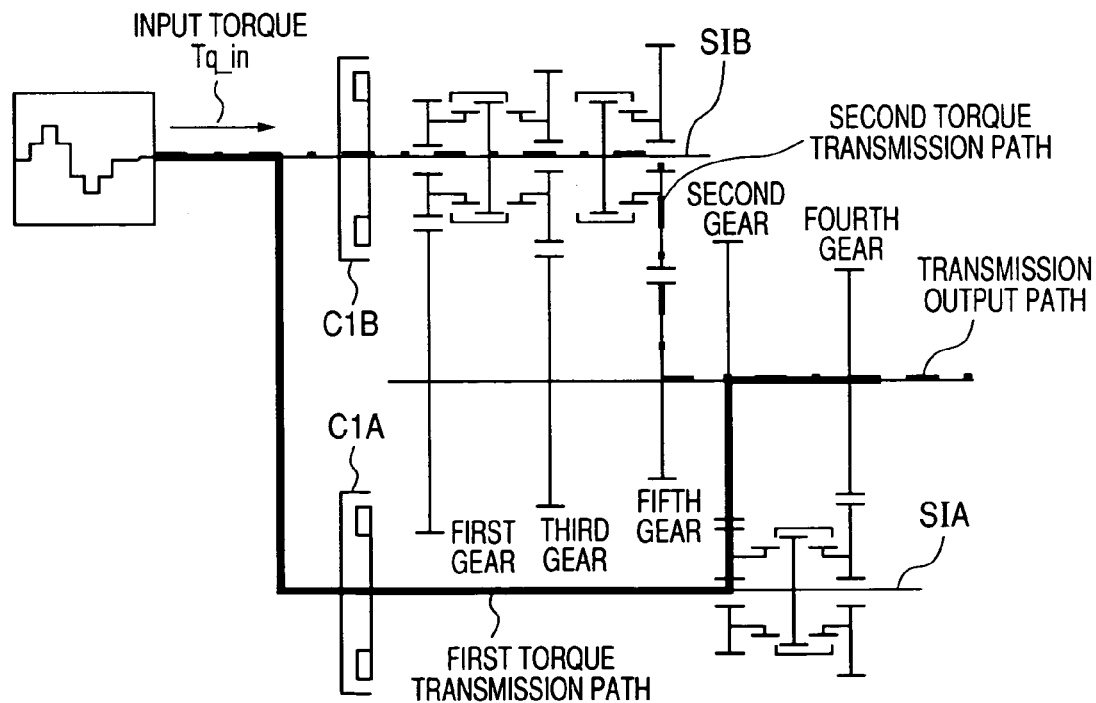
FIG. 17B indicates the torque transmission path for gear disengagement when speed is changed from the second to the fourth gear shift step, by way of an example.

FIG. 17B indicates the torque transmission path for gear disengagement when speed is changed from the second to the fourth gear shift step, by way of an example.

In FIG. 17B, the torque transmission path (solid line in FIG. 17B) for transmission of torque from the output shaft of the engine 1 to the output shaft of the transmission through the clutches C1A and the gear train on the input shaft SIA corresponds to the first torque transmission path given in FIG. 3. The torque transmission path (one-dot chain line in FIG. 17B) for transmission of torque from the output shaft of the engine 1 to the output shaft of the transmission through the clutches C1B and the gear train on the input shaft SIB corresponds to the second torque transmission path given in FIG. 3.

Figure 18:
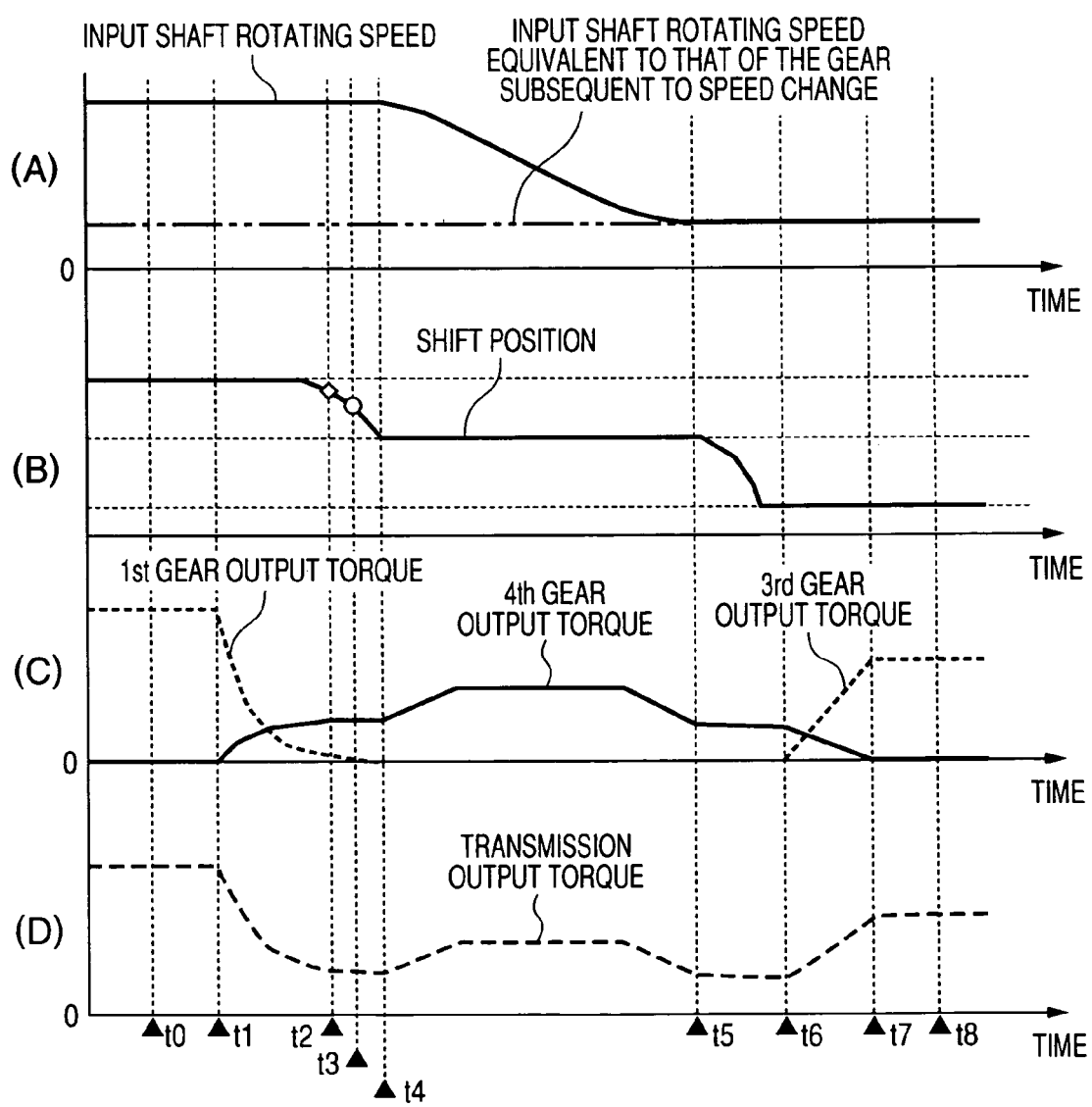
FIG. 18 is a time chart at the time of up-shift in the Example given in FIG. 16.

FIG. 18 is a time chart at the time of up-shift in the Example given in FIG. 16. The case of stepped speed change from the first to third gear is illustrated by way of an example. (A) shows the rotating speed of the second transmission input shaft SIB, (B) indicates the position (shift position) of the first engagement transmission mechanism L13, (C) represents the first, fourth and third gear output torque, and (D) shows the output shaft torque of the transmission output shaft SO.

The basic operation is the same as that given in FIG. 10, except that the assist clutch output torque shown in FIG. 10 is replaced by the output torque of the torque transmission path through which the torque is transmitted through the clutch C1A and fourth gear (hereinafter referred to as "fourth gear output torque").

In this case, the magnitude of the fourth gear output torque is adjusted continuously by the clutch C1A.

Time duration from time points t0 through t4 is the gear disengagement phase, time duration from t4 through t5 is the rotation-synchronization phase, time duration from t5 through t6 is the gear disengagement phase, and time duration from t6 through t7 is the fourth gear torque release phase. Time duration from t0 through t3 corresponds to the time duration from t0s through tgo in FIG. 1.

Rise of the fourth gear output torque starts at time point t1. As the fourth gear output torque rises, the first gear output torque reduces. At time point t2 when movement of the gear in the direction of disengagement has been detected, fourth gear output torque increase rate is reduced. After that, gear disengagement is carried out at time point t3. From time point t4 when the gear comes closer to the neutral point, the rotation synchronization control starts using the clutch C1A, whereby the input shaft rotating speed is rotation-synchronized to the level equivalent to the next gear shift step (time points t4 through t5 in (A)). When the input shaft rotating speed has reached the level corresponding to the next gear shift step, the gear is switched to the next shift step (time points t5 through t6 in (B)). When the gear has reached the next gear shift step, the release of the fourth gear output torque starts. Then with the release of the fourth gear output torque, torque is transmitted in the next gear shift step. In the final phase, the torque is transmitted only in the next gear (time points t6 through t7 in (C)). The speed change terminates at time point t8.

Figure 19:
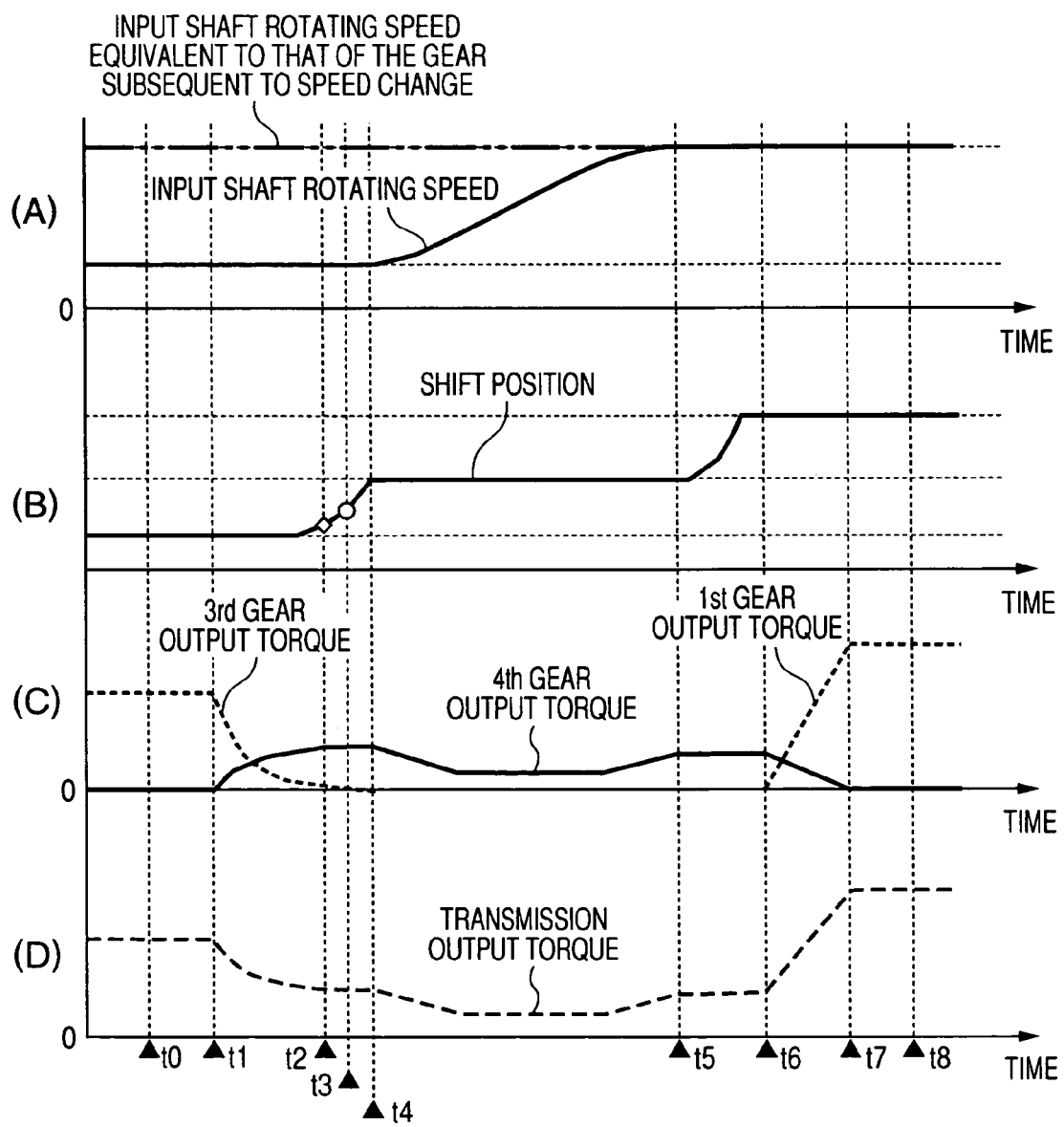
FIG. 19 is a time chart at the time of down-shift in the Example given in FIG. 16.

FIG. 19 is a time chart at the time of down-shift in the Example given in FIG. 16. The case of stepped speed change from the third to first gear is illustrated by way of an example. (A) shows the rotating speed of the transmission input shaft SIB, (B) indicates the position (shift position) of the first engagement transmission mechanism L13, (C) represents the third, fourth and first output torque, and (D) shows the output shaft torque of the transmission output shaft SO.

The basic operation is the same as that given in FIG. 11, except that the assist clutch output torque shown in FIG. 11 is replaced by the output torque of the torque transmission path through which the torque is transmitted through the clutch C1A and fourth gear (hereinafter referred to as "fourth gear output torque").

The magnitude of the aforementioned fourth gear output torque is adjusted continuously by the clutch C1A.

Time duration from time points t0 through t4 is the gear disengagement phase, time duration from t4 through t5 is the rotation-synchronization phase, time duration from t5 through t6 is the gear disengagement phase, and time duration from t6 through t7 is the fourth gear torque release phase. Time duration from t0 through t2 corresponds to the time duration from t0s through t5s in FIG. 1.

Rise of the fourth gear output torque starts at time point t1. As the fourth gear output torque rises, the gear output torque prior to speed change reduces. At time point t2, the movement of the gear in the direction of disengagement has been detected, and the fourth gear output torque increase rate is reduced.

After that, gear disengagement is carried out (at time point t3 in (B)). From time point t4 when the gear comes closer to the neutral point, the rotation synchronization control starts using the clutch C1A, whereby the input shaft rotating speed is rotation-synchronized to the level equivalent to the next gear shift step (time points t4 through t5 in (A)). When the input shaft rotating speed has reached the level corresponding to the next gear shift step, the gear is switched to the next shift step (time points t5 through t6 in (B)). When the gear has reached the next gear shift step, the release of the fourth gear output torque starts. Then with the release of the fourth gear output torque, torque is transmitted in the next gear shift step. In the final phase, the torque is transmitted only in the next gear (time points t6 through t7 in (C)). The speed change terminates at time point t8.

As described above, the present invention is also applicable to the twin clutch automated MT.

What is claimed is:

1. A vehicle control apparatus provided with an automatic transmission, wherein, when changing the speed by switching from a torque transmission path for transmitting an input shaft torque to an output shaft through a first gear pair and a first dog clutch, to a torque transmission path for transmitting said torque to said output shaft through a second gear pair and a second dog clutch, said automatic transmission takes the steps of:
    disengaging said first dog clutch while engaging an assist clutch for forming a torque transmission path between said input shaft and output shaft; and
    engaging the second clutch while disengaging the assist clutch;
    wherein said vehicle control apparatus further comprises a control section for controlling the assist clutch in such a way that the increase rate of the transmission torque accompanying engagement is reduced with the passage of time.

2. The vehicle control apparatus described in claim 1 further comprising:
    a timer for measuring and outputting the time from the start of speed change;
    a memory for storing a map associating the time measured by said timer with the assist clutch torque increase rate;
    wherein said control section comprises the steps of:
    acquiring the assist clutch torque increase rate conforming to the timer output from the map;
    determining an assist clutch target torque based on the assist clutch torque increase rate; and
    outputting a signal conforming to the assist clutch target torque to an assist clutch actuator.

3. The vehicle control apparatus described in claim 2 further comprising an input shaft torque determining section for determining the input shaft torque by detection or estimation, wherein said memory stores a map associating the time measured by said timer with the assist clutch torque increase rate for each input shaft torque, and the control section acquires the assist clutch torque increase rate conforming to the input shaft torque determining section and timer output from said map.

4. The vehicle control apparatus described in claim 1 further comprising:
    an input shaft torque determining section for determining the input shaft torque by detection or estimation; and
    an assist clutch transmission torque determining section for determining the assist clutch transmission torque by detection or estimation;
    wherein said control section determines whether or not the assist clutch transmission torque corresponds to the input shaft torque by comparison between the input shaft torque determined by the input shaft torque determining section and the assist clutch transmission torque determined by the assist clutch transmission torque determining section, whereby the assist clutch target torque increase rate is changed according to the result of this decision.

5. The vehicle control apparatus described in claim 4 further comprising:
    a timer for measuring and outputting the time from the start of speed change;

a memory for storing a map associating the time measured by said timer with the assist clutch torque increase rate;

wherein, if the difference between the input shaft torque determined by the input shaft torque determining section and the assist clutch transmission torque determined by the assist clutch transmission torque determining section is greater than a predetermined value, said control section acquires the assist clutch torque increase rate conforming to the input shaft torque determining section and timer output from said map, and outputs the signal conforming to the assist clutch torque increase rate to said actuator of the assist clutch;

whereas, if the difference between the input shaft torque determined by the input shaft torque determining section and the assist clutch transmission torque determined by the assist clutch transmission torque determining section does not exceed the predetermined value, said control section adds a predetermined value to the previous assist clutch target torque.

6. The vehicle control apparatus described in claim 1 further comprising a dog clutch engagement member position determining section for determining the first dog clutch engagement member position by detection or estimation, wherein said control section changes the assist clutch target torque increase rate based on the dog clutch engagement member position determined by the dog clutch engagement member position determining section.

7. The vehicle control apparatus described in claim 6 wherein, after the dog clutch engagement member position determined by the dog clutch engagement member position determining section has traveled to a predetermined position in the direction of disengagement, said control section reduces the assist clutch target torque increase rate.

8. The vehicle control apparatus described in claim 6 further comprising a dog clutch engagement member traveling speed determining section for determining the first dog clutch engagement member traveling speed by detection or estimation, wherein, if the dog clutch engagement member traveling speed determined by the dog clutch engagement member traveling speed determining section is equal to or greater than a predetermined value, said control section reduces the assist clutch target torque increase rate.

9. The vehicle control apparatus described in claim 6 further comprising a dog clutch engagement member traveling speed change determining section for determining the first dog clutch engagement member traveling speed change by detection or estimation, wherein, if the dog clutch engagement member traveling speed change determined by the dog clutch engagement member traveling speed change determining section is equal to or greater than a predetermined value, said control section reduces the assist clutch target torque increase rate.

10. The vehicle control apparatus described in claim 1 further comprising an input shaft rotating speed determining section for determining the input shaft rotating speed by detection or estimation, wherein said control section changes the assist clutch target torque increase rate based on the input shaft rotating speed determined by the input shaft rotating speed determining section.

11. The vehicle control apparatus described in claim 1 further comprising an output shaft rotating speed determining section for determining the output shaft rotating speed by detection or estimation, wherein said control section changes the assist clutch target torque increase rate based on the output shaft rotating speed determined by the output shaft rotating speed determining section.

12. The vehicle control apparatus described in claim 1 further comprising an output shaft torque determining section for determining the output shaft torque by detection or estimation, wherein said control section changes the assist clutch target torque increase rate based on the output shaft torque determined by the output shaft torque determining section.

13. The vehicle control apparatus described in claim 1 further comprising a vehicle acceleration rate determining section for determining vehicle acceleration rate by detection or estimation, wherein said control section changes the assist clutch target torque increase rate based on the vehicle acceleration rate determined by the vehicle acceleration rate determining section.

14. The vehicle control apparatus described in claim 1 wherein said control section changes the assist clutch target torque increase rate in response to the change in the parameter representing at least one of a prime mover for inputting torque to the input shaft, said automatic transmission and the operating conditions of said vehicle.

15. The vehicle control apparatus described in claim 1 wherein said control section provides control in such a way that a control signal for the assist clutch is changed in the direction of reducing the increase rate in the assist clutch torque transmission amount, in response to the change in the parameter representing at least one of a prime mover for inputting torque to the input shaft, said automatic transmission and the operating conditions of said vehicle.

16. The vehicle control apparatus described in claim 15 wherein said parameter represents any one of the dog clutch engagement member position, dog clutch engagement member traveling speed, dog clutch engagement member traveling speed change, input shaft rotating speed change, vehicle acceleration rate, output shaft torque and output shaft rotating speed change.

17. A vehicle control apparatus provided with an automatic transmission, wherein speed is changed by switching:
from the first torque transmission path for transmitting the torque to the output shaft through the first gear pair arranged on the first input shaft and first dog clutch, through the steps of transmitting the torque from a prime mover to two input shafts through a twin clutch having a first clutch arranged on the first input shaft and a second clutch arranged on the second input shaft, and changing the position of the two clutches of the twin clutch,
to the second torque transmission path for transmitting the torque to the output shaft through the second gear pair arranged on the first input shaft and second dog clutch;
said vehicle control apparatus further comprising an automatic transmission so as to form said second torque transmission path temporarily when the first torque transmission path is switched to a third torque transmission path made up of a third gear pair arranged on the first input shaft and a third dog clutch, said automatic transmission comprising steps of:
disengaging the first dog clutch while engaging the second clutch of the twin clutch; and
engaging the third dog clutch while disengaging the second clutch of the twin clutch;
wherein said vehicle control apparatus further comprises a control section for controlling the second clutch of the twin clutch in such a way that the increase rate of the transmission torque accompanying engagement is reduced with the passage of time.

18. The vehicle control apparatus described in claim 17 wherein a control signal for the second clutch of the twin clutch changes in response to the change in the parameter representing at least one of a prime mover for inputting torque to the input shaft, said automatic transmission and the operating conditions of said vehicle.

19. The vehicle control apparatus described in claim 18 wherein said parameter represents any one of the dog clutch engagement member position, dog clutch engagement member traveling speed, dog clutch engagement member traveling speed change, input shaft rotating speed change, vehicle acceleration rate, output shaft torque and output shaft rotating speed change.

20. A vehicle control method, when changing the speed by switching from a first torque transmission path for transmitting an input shaft torque to an output shaft through a first gear pair and a first dog clutch to a second torque transmission path for transmitting said torque to said output shaft through a second gear pair and a second dog clutch, comprising steps of
- disengaging the first dog clutch while engaging the third clutch for forming a third torque transmission path different from the first and second torque transmission paths;
- engaging the second dog clutch while disengaging the third clutch; and
- controlling the third clutch in such a way that the increase rate of the transmission torque accompanying engagement is reduced with the passage of time.

* * * * *